(12) United States Patent
Carrigg et al.

(10) Patent No.: US 12,055,939 B2
(45) Date of Patent: Aug. 6, 2024

(54) SYSTEM AND METHOD FOR SURFACE FEATURE DETECTION AND TRAVERSAL

(71) Applicant: DEKA Products Limited Partnership, Manchester, NH (US)

(72) Inventors: Emily A. Carrigg, Weare, NH (US); Patrick Steele, Bedford, NH (US); Gregory J. Buitkus, Dracut, MA (US); Benjamin V. Hersh, Raymond, NH (US); FNU G. Siva Perumal, Manchester, NH (US); David Carrigg, Manchester, NH (US); Kartik Khanna, Manchester, NH (US); Daniel F. Pawlowski, Raymond, NH (US); Arunabh Mishra, Manchester, NH (US); Yashovardhan Chaturvedi, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 625 days.

(21) Appl. No.: 16/800,497

(22) Filed: Feb. 25, 2020

(65) Prior Publication Data

US 2020/0271451 A1 Aug. 27, 2020

Related U.S. Application Data

(60) Provisional application No. 62/851,881, filed on May 23, 2019, provisional application No. 62/851,266, (Continued)

(51) Int. Cl.
*G05D 1/02* (2020.01)
*G01C 21/20* (2006.01)
(Continued)

(52) U.S. Cl.
CPC ............ *G05D 1/0214* (2013.01); *G01C 21/20* (2013.01); *G06F 16/285* (2019.01); *G06F 16/29* (2019.01);
(Continued)

(58) Field of Classification Search
CPC ....... G01C 21/20; G06F 16/285; G06F 16/29; G06T 17/20; G06T 2207/10028
See application file for complete search history.

(56) References Cited

U.S. PATENT DOCUMENTS 6,571,892 B2   6/2003  Kamen et al.
8,392,117 B2   3/2013  Dolgov et al.
(Continued)

FOREIGN PATENT DOCUMENTS

DE   102014110413 A1 *  1/2016  ............ B25J 9/1025
JP      2017167092 A  *  9/2017
(Continued)

OTHER PUBLICATIONS

English translation of DE-102014110413-A1.*
(Continued)

*Primary Examiner* — Anshul Sood
*Assistant Examiner* — Matthew Ho
(74) *Attorney, Agent, or Firm* — William A. Bonk, III

(57) ABSTRACT

Substantially discontinuous surface feature traversal feature of the present teachings can leverage a transport device (TD), for example, but not limited to, an autonomous device or a semi-autonomous device, to navigate in environments that can include features such as substantially discontinuous surface features. The substantially discontinuous surface feature traversal feature can enable the TD to travel on an expanded variety of surfaces. In particular, substantially discontinuous surface features can be accurately identified and labeled so that the TD can automatically maintain the (Continued)

performance of the TD during ingress and egress of the substantially discontinuous surface feature.

20 Claims, 28 Drawing Sheets

Related U.S. Application Data filed on May 22, 2019, provisional application No. 62/809,973, filed on Feb. 25, 2019.

(51) Int. Cl.
    *G05D 1/00*     (2006.01)
    *G06F 16/28*     (2019.01)
    *G06F 16/29*     (2019.01)
    *G06T 17/20*     (2006.01)
    *G06V 10/44*     (2022.01)

(52) U.S. Cl.
    CPC .... *G06T 17/20* (2013.01); *G06T 2207/10028* (2013.01); *G06V 10/44* (2022.01)

(56) References Cited

U.S. PATENT DOCUMENTS

| | | | |
|---|---|---|---|
| 9,285,230 | B1 | 3/2016 | Silver et al. |
| 9,395,192 | B1 * | 7/2016 | Silver .................. G06V 20/588 |
| 9,443,163 | B2 | 9/2016 | Springer |
| 9,823,661 | B2 | 11/2017 | Pink et al. |
| 9,997,075 | B2 | 6/2018 | Ono et al. |
| 10,108,866 | B2 | 10/2018 | Prinet et al. |
| 10,365,649 | B2 | 7/2019 | Zhu et al. |
| 10,921,817 | B1 * | 2/2021 | Kangaspunta ........ G01S 7/4802 |
| 11,043,026 | B1 * | 6/2021 | Fathi ...................... G06N 20/00 |
| 11,199,853 | B1 * | 12/2021 | Afrouzi ................ G05D 1/0246 |
| 2009/0105939 | A1 | 4/2009 | Dolgov et al. |
| 2010/0274430 | A1 * | 10/2010 | Dolgov .................. G01C 21/20 701/25 |
| 2012/0113287 | A1 * | 5/2012 | Johnson ................. H04N 25/60 348/222.1 |
| 2016/0026184 | A1 | 1/2016 | Olshansky et al. |
| 2018/0045520 | A1 | 2/2018 | Haverl |
| 2018/0181133 | A1 * | 6/2018 | Zhang .................. G05D 1/0214 |
| 2018/0306587 | A1 | 10/2018 | Holz |
| 2019/0163175 | A1 | 5/2019 | Ko et al. |
| 2019/0287063 | A1 | 9/2019 | Skaaksrud et al. |
| 2019/0340447 | A1 | 11/2019 | Wei et al. |
| 2020/0355513 | A1 * | 11/2020 | Ma ........................ G06T 7/0002 |

FOREIGN PATENT DOCUMENTS

| | | | | |
|---|---|---|---|---|
| JP | 2018181047 | A | * | 11/2018 |
| JP | 2016522508 | | | 5/2019 |
| KR | 101209573 | | | 12/2012 |
| KR | 20180100355 | A | * | 9/2018 |
| WO | 2007057274 | | | 5/2007 |
| WO | WO-2012034236 | A1 * | 3/2012 | ............. G01C 11/00 |
| WO | WO-2017195403 | A1 * | 11/2017 | ............... B60R 1/00 |
| WO | WO-2018159690 | A1 * | 9/2018 | ........... G01B 11/303 |

OTHER PUBLICATIONS

English translation of JP-2018181047-A.*
English translation of JP-2017167092-A.*
English translation of WO-2018159690-A1.*
English translation of KR 20180100355 A.*
English translation of WO-2017195403-A1.*
Benoit Morisset et al., Leaving Fatland: Toward real-time 3D navigation, 2009 IEEE Internaional Conference on Robotics and Automation, Kobe Japan, May 12, 2009.
Chen et al., Velodyne-based Curb Detection Up to 50 Meters Away, National University of Defense Technology, DOI:10.13140/RG.2.1.4714.7680, Jun. 2015.
El-Halawany et al., Detection of Road Curb from Mobile Terrestrial Laser Scanner Point Cloud, International Archives of the Photogrammetry, Remote Sensing and Spatial Information Sciences, vol. XXXVIII-5/W12, 2011 ISPRS Calgary 2011 Workshop, Calgary, Canada, Aug. 29-31, 2011.
Hu et al., Real-time extraction method of road boundary based on three-dimensional lidar, IOP Conference Series: Journal of Physics: Conference Series 1074 (2018) 012080, DOI:10/1088/1742-6596/1074/1/012080, 2018.
Huang et al., A Practical Point Could Based Road Curb Detection Method for Autonomous Vehicle, MDPI, Information (Switzerland) 8(3):93, DOI: 10.3390/info8030093, Jul. 30, 2017.
Mohammad Norouzi et al., Planning for high-visibility stable paths for reconfiguragle robots on uneven terrain, 2012 IEEE/RSJ International Conference on Intelligent Robots and Systems, Oct. 7, 2012.
Radu Bogdan Rusu et al., Leaving Flatland: Efficient real-time three-dimensional perception and motion planning, Journal of Field Robotics, vol. 26:10, Oct. 1, 2009.
Rhee et al., Low-Cost Curb Detection and Localization System Using Multiple Ultrasonic Sensors, *Sensors* 2019, 19(6), 1389, https://doi.org/10.3390/s19061389, Mar. 21, 2019.
Rodriquez-Cuenca et al., Morphological Operations to Extract Urban Curbs in 3D MLS Point Clouds, ISPRS Int. J. Geo-Inf. 2016, 5(6), 93; https://doi.org/10.3390/ijgi5060093, Jun. 14, 2016.
Zhang et al., Road-Segmentation based Curb Detection Method for Self-driving via a 3D-LiDAR Sensor, IEEE Transactions on Intelligent Transportation Systems, vol. 19:12, Dec. 2018).
Zhang et al., A real-time curb detection and tracking method for UGVs by using a 3D-LIDAR sensor, 2015 IEEE Conference on Control Applications (CCA), Sep. 21-23, 2015, DOI: 10.1109/CCA.2015.7320746, Sep. 2015.
International Search Report and Written Opinion, App # PCT/US2020/019670, mailed Jul. 6, 2020.
Burger, Occupancy Grid Mapping using Stereo Vision, Thesis, Master of Engineering, Stellenbosch University, Mar. 2015.
Grabowski et al., Autonomous Exploration via Regions of Interest, Carnegie Mellow University, Proceedings, 2003 IEEE/RSJ International Conference on Intelligent Robots and systems, vol. 2, DOI:10.1109/IROS.2003.1248887, 2003.
Guo et al., On Calibration of Modern Neural Networks, arXiv: 1706.04599v2 [cs.LG] Aug. 3, 2017.
Hinton et al., Distilling Knowledge in a Neural Network, arXiv:1503.02531v1 [stat.ML] Mar. 9, 2015.
Mangalam et al., U-Net Compression Using Knowledge Distillation, Master's Semester Project, EPFL, Switzerland, karttikeyamangalam@gmail.com, https://karttikeya.github.io/, Feb. 2018.
Sless et al., Self-Supervised Occupancy Grid Learning From Sparse Radar for Autonomous Driving, General Motors, Advanced Technical Center, Israel, arXiv:1904.00415v1 [cs.CV] Mar. 31, 2019.
Thrun et al., Probabilistic Robotics, Early draft—not for distribution, https://docs.ufpr.br/~danielsantos/ProbabilisticRobotics.pdf, 1999-2000.
Communication mailed Oct. 8, 2021, issued in European Patent Application No. 20712791.1, 3 pages.
Summary of May 1, 2022, Office Action issued in Israeli Patent Application No. 285836, 2 pages.
Park et al., A New Concave Hull Algorithm and Concaveness Measure for n-dimensional Datasets, Journal of Information Science and Engineering 28, pp. 587-600, 2012.
Office Action mailed Jun. 20, 2022, issued in U.S. Appl. No. 16/926,522, 26 pages.
Preliminary Report on Patentability, mailed Jan. 11, 2022, issued in PCT Patent Application No. PCT/US2020/041711, 15 pages.
U.S. Appl. No. 16/926,522, filed Jul. 10, 2020.
pointclouds.org/documentation/tutorials/statistical_outlier.php Link to non-patent literature was available at time of disclosure in application on filing; however, the link is no longer valid.
pointclouds.org/documentation/tutorials/hull_2d.php Link to non-patent literature was available at time of disclosure in application on filing; however, the link is no longer valid.

(56) References Cited

OTHER PUBLICATIONS http://pointclouds.org/documentation/tutorials/region_growing_segmentation.php. Link to non-patent literature was available at time of disclosure in application on filing; however, the link is no longer valid.

http://pointclouds.org/documentation/tutorials/cluster_extraction.php#cluster-extraction Link to non-patent literature was available at time of disclosure in application on filing; however, the link is no longer valid.

Angus Johnson, Clipper2—Polygon Clipping and Offsetting Library, Copyright 2010-2022. http://www.angusj.com/delphi/clipper.php Downloaded Feb. 8, 2023.

ArcMap Clipping a polygon feature http://desktop.arcgis.com/en/arcmap/10.3/manage-data/editing-existing-features/clipping-a-polygon-feature.htm Downloaded Feb. 8, 2023.

https://github.com/mapbox/earcut.hpp github.com/mapbox/earcut.hpp Link to non-patent literature was available at time of disclosure in application on filing; however, the link is no longer valid.

projects.coin-or.org/Ipopt Link to non-patent literature was available at time of disclosure in application on filing; however, the link is no longer valid.

\* cited by examiner

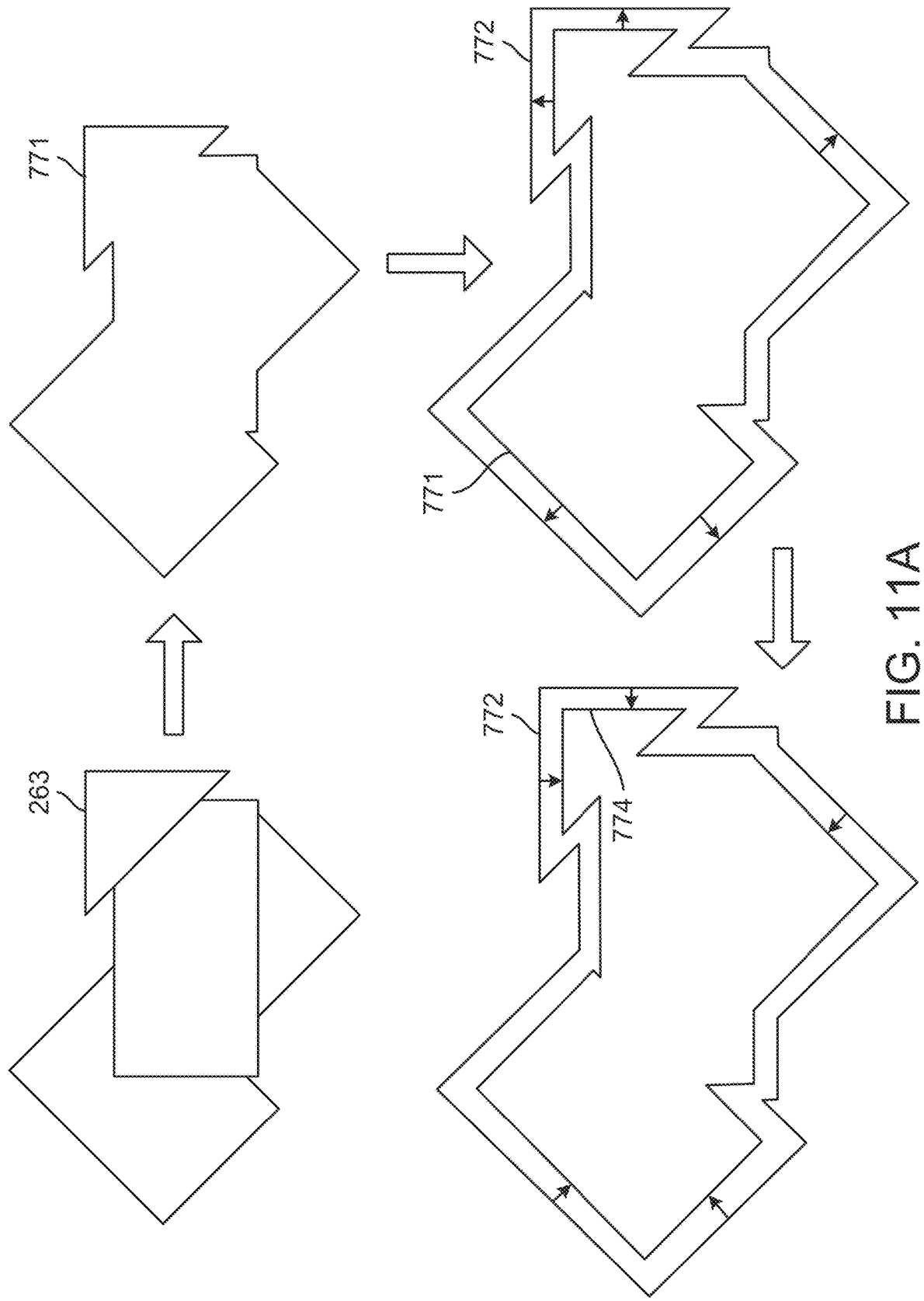

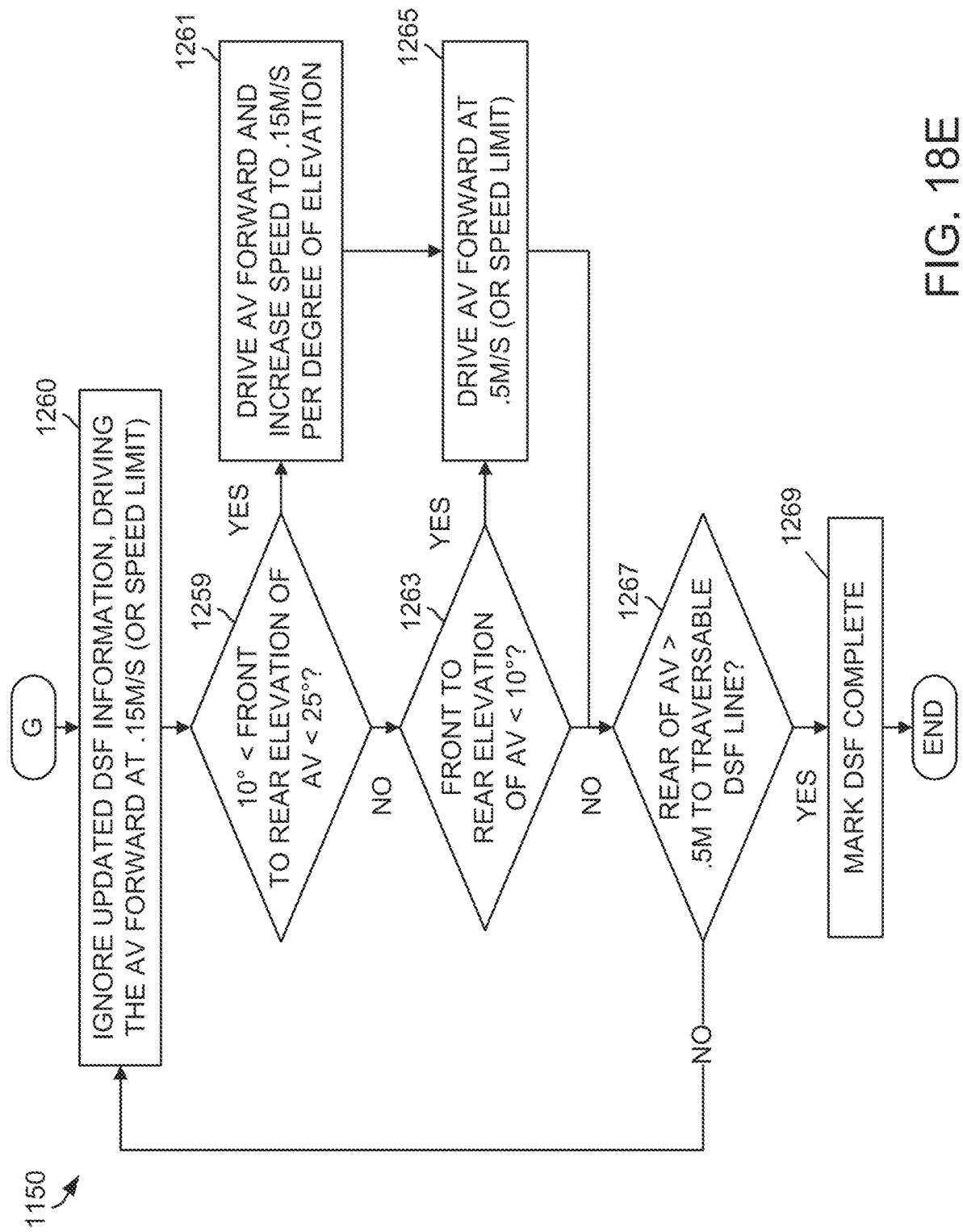

SYSTEM AND METHOD FOR SURFACE FEATURE DETECTION AND TRAVERSAL

CROSS REFERENCE TO RELATED APPLICATIONS

This utility patent application claims the benefit of U.S. Provisional Patent Application Ser. No. 62/809,973 filed Feb. 25, 2019, entitled System and Method for Surface Feature Detection and Traversal, U.S. Provisional Patent Application Ser. No. 62/851,266 filed May 22, 2019, entitled System and Method for Surface Feature Traversal, and U.S. Provisional Patent Application Ser. No. 62/851,881 filed May 23, 2019, entitled System and Method for Surface Feature Traversal, which are incorporated herein by reference in their entirety.

BACKGROUND

The present teachings relate generally to surface feature detection and traversal. Surface feature traversal is challenging because surface features, for example, but not limited to, substantially discontinuous surface features (SDSFs), can be found amidst heterogeneous topology, and that topology can be unique to a specific geography. SDSFs, such as, for example, but not limited to, inclines, edges, curbs, steps, and curb-like geometries (referred to herein, in a non-limiting way, as SDSFs or simply surface features), however, can include some typical characteristics that can assist in their identification.

A wide range of devices and methods are known for transporting, for example, people and cargo, including autonomous transport. The design of these devices has addressed uneven driving surfaces in several different ways. What is missing, however, is the ability to locate SDSFs based on a multi-part model that is associated with several criteria for SDSF identification. Also, what is missing is integration of a located SDSF trajectory with the graphing polygons that can form a route topology. Still further, nowhere has the determination of candidate surface feature traversals relied upon criteria such as candidate traversal approach angle, candidate traversal driving surface on both sides of the candidate surface feature, and candidate traversal path obstructions.

SUMMARY

The SDSF traversal of the present teachings can leverage a transport device (TD), for example, but not limited to, an autonomous device or a semi-autonomous device, to navigate in environments that can include features such as SDSFs. The SDSF traversal feature can enable the TD to travel on an expanded variety of surfaces. In particular, SDSFs can be accurately identified so that the TD can automatically maintain its performance during traversal of the SDSF. In some configurations, a SDSF can be identified by its dimensions. For example, a curb can include, but is not limited to including, a width of about 0.6-0.7 m. In some configurations, point cloud data can be processed to locate SDSFs, and those data can be used to prepare a path for the TD from a beginning point to a destination. While the TD is traveling the path, in some configurations, SDSF traversal can be accommodated through sensor-based positioning of the TD.

In some configurations, the method of the present teachings for navigating at least one SDSF encountered by a TD, where the TD travels a path over a surface, where the surface includes the at least one SDSF, and where the path includes a starting point and an ending point, the method can include, but is not limited to including, accessing point cloud data representing the surface, filtering the point cloud data, forming the filtered point cloud data into processable parts, and merging the processable parts into at least one concave polygon. The method can include locating and labeling the at least one SDSF in the at least one concave polygon. The locating and labeling can form labeled point cloud data. The method can include creating graphing polygons based at least on the at least one concave polygon, and choosing the path from the starting point to the ending point based at least on the graphing polygons. The TD can traverse the at least one SDSF along the path.

Filtering the point cloud data can optionally include conditionally removing points representing transient objects and points representing outliers from the point cloud data, and replacing the removed points having a pre-selected height. Forming processing parts can optionally include segmenting the point cloud data into the processable parts, and removing points of a pre-selected height from the processable parts. Merging the processable parts can optionally include reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. Locating and labeling the at least one SDSF feature can optionally include sorting the point cloud data of the drivable surfaces according to a SDSF filter, the SDSF filter including at least three categories of points, and locating the at least one SDSF point based at least on whether the categories of points, in combination, meet at least one first pre-selected criterion. The method can optionally include creating at least one SDSF trajectory based at least on whether a plurality of the at least one SDSF points, in combination, meet at least one second pre-selected criterion. Creating graphing polygons further can optionally include creating at least one convex polygon from the at least one drivable surface. The at least one convex polygon can include edges. Creating graphing polygons can include smoothing the edges, forming a driving margin based on the smoothed edges, adding the at least one SDSF trajectory to the at least one drivable surface, and removing edges from the at least one drivable surface according to at least one third pre-selected criterion. Smoothing of the edges can optionally include trimming the edges outward. Forming a driving margin of the smoothed edges can optionally include trimming the outward edges inward.

In some configurations, the system of the present teachings for navigating at least one SDSF encountered by a TD, where the TD travels a path over a surface, where the surface includes the at least one SDSF, where the path includes a starting point and an ending point, the system can include, but is not limited to including, a first processor accessing point cloud data representing the surface, a first filter filtering the point cloud data, a second processor forming processable parts from the filtered point cloud data, a third processor merging the processable parts into at least one concave polygon, a fourth processor locating and labeling the at least one SDSF in the at least one concave polygon, the locating and labeling forming labeled point cloud data, a fifth processor creating graphing polygons, and a path selector choosing the path from the starting point to the ending point based at least on the graphing polygons. The TD can traverse the at least one SDSF along the path.

The first filter can optionally include executable code that can include, but is not limited to including, conditionally removing points representing transient objects and points representing outliers from the point cloud data, and replacing the removed points having a pre-selected height. The segmenter can optionally include executable code that can include, but is not limited to including, segmenting the point cloud data into the processable parts, and removing points of a pre-selected height from the processable parts. The third processor can optionally include executable code that can include, but is not limited to, reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. The fourth processor can optionally include executable code that can include, but is not limited to including, sorting the point cloud data of the drivable surfaces according to a SDSF filter, the SDSF filter including at least three categories of points, and locating the at least one SDSF point based at least on whether the categories of points, in combination, meet at least one first pre-selected criterion. The system can optionally include executable code that can include, but is not limited to including, creating at least one SDSF trajectory based at least on whether a plurality of the at least one SDSF points, in combination, meet at least one second pre-selected criterion.

Creating graphing polygons can optionally include executable code that can include, but is not limited to including, creating at least one convex polygon from the at least one drivable surface, the at least one convex polygon including edges, smoothing the edges, forming a driving margin based on the smoothed edges, adding the at least one SDSF trajectory to the at least one drivable surface, and removing edges from the at least one drivable surface according to at least one third pre-selected criterion. Smoothing the edges can optionally include executable code that can include, but is not limited to including, trimming the edges outward. Forming a driving margin of the smoothed edges can optionally include executable code that can include, but is not limited to including, trimming the outward edges inward.

In some configurations, the method of the present teachings for navigating at least one SDSF encountered by a TD, where the TD travels a path over a surface, where the surface includes the at least one SDSF, where the path includes a starting point and an ending point, the method can include, but is not limited to including, accessing a route topology. The route topology can include at least one graphing polygon that can include filtered point cloud data. The point cloud data can include labeled features and a drivable margin. The method can include transforming the point cloud data into a global coordinate system, determining boundaries of the at least one SDSF, creating SDSF buffers of a pre-selected size around the boundaries, determining which of the at least one SDSFs can be traversed based at least on at least one SDSF traversal criterion, creating an edge/weight graph based at least on the at least one SDSF traversal criterion, the transformed point cloud data, and the route topology, and choosing a path from the starting point to the destination point based at least on the edge/weight graph.

The at least one SDSF traversal criterion can optionally include a pre-selected width of the at least one SDSF and a pre-selected smoothness of the at least one SDSF, a minimum ingress distance and a minimum egress distance between the at least one SDSF and the TD including a drivable surface, and a minimum ingress distance between the at least one SDSF and the TD that can accommodate approximately a 90° approach by the TD to the at least one SDSF.

In some configurations, the system of the present teachings for navigating at least one SDSF encountered by a TD, where the TD travels a path over a surface, where the surface includes the at least one SDSF, and where the path includes a starting point and an ending point, the system can include, but is not limited to including, a sixth processor accessing a route topology. The route topology can include at least one graphing polygon that can include filtered point cloud data. The point cloud data can include labeled features and a drivable margin. The system can include a seventh processor transforming the point cloud data into a global coordinate system, and a eighth processor determining boundaries of the at least one SDSF. The eighth processor can create SDSF buffers of a pre-selected size around the boundaries. The system can include a ninth processor determining which of the at least one SDSFs can be traversed based at least on at least one SDSF traversal criterion, a tenth processor creating an edge/weight graph based at least on the at least one SDSF traversal criterion, the transformed point cloud data, and the route topology, and a base controller choosing a path from the starting point to the destination point based at least on the edge/weight graph.

In some configurations, the method of the present teachings for navigating at least one SDSF encountered by a TD, where the TD travels a path over a surface, where the surface includes the at least one SDSF, and where the path includes a starting point and an ending point, the method can include, but is not limited to including, accessing point cloud data representing the surface. The method can include filtering the point cloud data, forming the filtered point cloud data into processable parts, and merging the processable parts into at least one concave polygon. The method can include locating and labeling the at least one SDSF in the at least one concave polygon. The locating and labeling can form labeled point cloud data. The method can include creating graphing polygons based at least on the at least one concave polygon. The graphing polygons can form a route topology, and the point cloud data can include labeled features and a drivable margin. The method can include transforming the point cloud data into a global coordinate system, determining boundaries of the at least one SDSF, creating SDSF buffers of a pre-selected size around the boundaries, determining which of the at least one SDSFs can be traversed based at least on at least one SDSF traversal criterion, creating an edge/weight graph based at least on the at least one SDSF traversal criterion, the transformed point cloud data, and the route topology, and choosing a path from the starting point to the destination point based at least on the edge/weight graph.

Filtering the point cloud data can optionally include conditionally removing points representing transient objects and points representing outliers from the point cloud data, and replacing the removed points having a pre-selected height. Forming processing parts can optionally include segmenting the point cloud data into the processable parts, and removing points of a pre-selected height from the processable parts. Merging the processable parts can optionally include reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. Locating and labeling the at least one SDSF can optionally include sorting the point cloud data of the drivable surfaces according to a SDSF filter, the SDSF filter including at least three categories of points, and locating the at least one SDSF point based at least on whether the categories of points, in combination, meet at least one first pre-selected criterion. The method can optionally include creating at least one SDSF trajectory based at least on whether a plurality of the at least one SDSF points, in combination, meet at least one second pre-selected criterion. Creating graphing polygons further can optionally include creating at least one convex polygon from the at least one drivable surface. The at least one convex polygon can include edges. Creating graphing polygons can include smoothing the edges, forming a driving margin based on the smoothed edges, adding the at least one SDSF trajectory to the at least one drivable surface, and removing edges from the at least one drivable surface according to at least one third pre-selected criterion. Smoothing of the edges can optionally include trimming the edges outward. Forming a driving margin of the smoothed edges can optionally include trimming the outward edges inward. The at least one SDSF traversal criterion can optionally include a pre-selected width of the at least one and a pre-selected smoothness of the at least one SDSF, a minimum ingress distance and a minimum egress distance between the at least one SDSF and the TD including a drivable surface, and a minimum ingress distance between the at least one SDSF and the TD that can accommodate approximately a 90° approach by the TD to the at least one SDSF.

In some configurations, the system of the present teachings for navigating at least one SDSF encountered by a TD, where the TD travels a path over a surface, where the surface includes the at least one SDSF, where the path includes a starting point and an ending point, the system can include, but is not limited to including, a point cloud accessor accessing point cloud data representing the surface, a first filter filtering the point cloud data, a segmenter forming processable parts from the filtered point cloud data, a third processor merging the processable parts into at least one concave polygon, a fourth processor locating and labeling the at least one SDSF in the at least one concave polygon, the locating and labeling forming labeled point cloud data, a fifth processor creating graphing polygons. The route topology can include at least one graphing polygon that can include filtered point cloud data. The point cloud data can include labeled features and a drivable margin. The system can include a seventh processor transforming the point cloud data into a global coordinate system, and a eighth processor determining boundaries of the at least one SDSF. The eighth processor can create SDSF buffers of a pre-selected size around the boundaries. The system can include a ninth processor determining which of the at least one SDSFs can be traversed based at least on at least one SDSF traversal criterion, a tenth processor creating an edge/weight graph based at least on the at least one SDSF traversal criterion, the transformed point cloud data, and the route topology, and a base controller choosing a path from the starting point to the destination point based at least on the edge/weight graph.

The first filter can optionally include executable code that can include, but is not limited to including, conditionally removing points representing transient objects and points representing outliers from the point cloud data, and replacing the removed points having a pre-selected height. The segmenter can optionally include executable code that can include, but is not limited to including, segmenting the point cloud data into the processable parts, and removing points of a pre-selected height from the processable parts. The third processor can optionally include executable code that can include, but is not limited to including, reducing the size of the processable parts by analyzing outliers, voxels, and normal, growing regions from the reduced-size processable parts, determining initial drivable surfaces from the grown regions, segmenting and meshing the initial drivable surfaces, locating polygons within the segmented and meshed initial drivable surfaces, and setting the drivable surfaces based at least on the polygons. The fourth processor can optionally include executable code that can include, but is not limited to including, sorting the point cloud data of the drivable surfaces according to a SDSF filter, the SDSF filter including at least three categories of points, and locating the at least one SDSF point based at least on whether the categories of points, in combination, meet at least one first pre-selected criterion. The system can optionally include executable code that can include, but is not limited to including, creating at least one SDSF trajectory based at least on whether a plurality of the at least one SDSF points, in combination, meet at least one second pre-selected criterion.

Creating graphing polygons can optionally include executable code that can include, but is not limited to including, creating at least one convex polygon from the at least one drivable surface, the at least one convex polygon including edges, smoothing the edges, forming a driving margin based on the smoothed edges, adding the at least one SDSF trajectory to the at least one drivable surface, and removing edges from the at least one drivable surface according to at least one third pre-selected criterion. Smoothing the edges can optionally include executable code that can include, but is not limited to including, trimming the edges outward. Forming a driving margin of the smoothed edges can optionally include executable code that can include, but is not limited to including, trimming the outward edges inward.

In some configurations, the method of the present teachings for navigating a transport device (TD) along a path line in a travel area towards a goal point across at least one SDSF, the TD including a leading edge and a trailing edge, can include, but is not limited to including, receiving SDSF information and obstacle information for the travel area, detecting at least one candidate SDSF from the SDSF information, and selecting a SDSF line from the at least one candidate SDSF line based on at least one selection criterion. The method can include determining at least one traversable part of the selected SDSF line based on at least one location of at least one obstacle found in the obstacle information in the vicinity of the selected SDSF line, heading the TD, operating at a first speed towards the at least one traversable part, by turning the TD to travel along a line perpendicular to the traversable part, and constantly correcting a heading of the TD based on a relationship between the heading and the perpendicular line. The method can include driving the TD at a second speed by adjusting the first speed of the TD based at least on the heading and a distance between the TD and the traversable part. If a SDSF associated with the at least one traversable part is elevated relative to a surface of the travel route, the method can include traversing the SDSF by elevating the leading edge relative to the trailing edge and driving the TD at a third increased speed per degree of elevation, and driving the TD at a fourth speed until the TD has cleared the SDSF.

Detecting at least one candidate SDSF from the SDSF information can optionally include (a) drawing a closed polygon encompassing a location of the TD, and a location of a goal point, (b) drawing a path line between the goal point and the location of the TD, (c) selecting two SDSF points from the SDSF information, the SDSF points being located within the polygon, and (d) drawing a SDSF line between the two points. Detecting at least one candidate SDSF can include (e) repeating steps (c)-(e) if there are fewer than a first pre-selected number of points within a first pre-selected distance of the SDSF line, and if there have been less than a second pre-selected number of attempts at choosing the SDSF points, drawing a line between them, and having fewer than the first pre-selected number of points around the SDSF line. Detecting at least one candidate SDSF can include (f) fitting a curve to the SDSF points that fall within the first pre-selected distance of the SDSF line if there are the first pre-selected number of points or more, (g) identifying the curve as the SDSF line if a first number of the SDSF points that are within the first pre-selected distance of the curve exceeds a second number of the SDSF points within the first pre-selected distance of the SDSF line, and if the curve intersects the path line, and if there are no gaps between the SDSF points on the curve that exceed a second pre-selected distance. Detecting at least one candidate SDSF can include (h) repeating steps (f)-(h) if the number of points that are within the first pre-selected distance of the curve does not exceed the number of points within the first pre-selected distance of the SDSF line, or if the curve does not intersect the path line, or if there are gaps between the SDSF points on the curve that exceed the second pre-selected distance, and if the SDSF line is not remaining stable, and if steps (f)-(h) have not been attempted more than the second pre-selected number of attempts.

The closed polygon can optionally include a pre-selected width, and the pre-selected width can optionally include a width dimension of the TD. Selecting the SDSF points can optionally include random selection. The at least one selection criterion can optionally include a first number of the SDSF points within the first pre-selected distance of the curve exceeds a second number of SDSF points within the first pre-selected distance of the SDSF line, the curve intersects the path line, and there are no gaps between the SDSF points on the curve that exceed a second pre-selected distance.

Determining at least one traversable part of the selected SDSF can optionally include selecting a plurality of obstacle points from the obstacle information. Each of the plurality of obstacle points can include a probability that the obstacle point is associated with the at least one obstacle. Determining at least one traversable part can include projecting the plurality of obstacle points to the SDSF line if the probability is higher than a pre-selected percent, and any of the plurality of obstacle points lies between the SDSF line and the goal point, and if any of the plurality of obstacle points is less than a third pre-selected distance from the SDSF line, forming at least one projection. Determining at least one traversable part can optionally include connecting at least two of the at least one projection to each other, locating end points of the connected at least two projections along the SDSF line, marking as a non-traversable SDSF section the connected at least two projections, and marking as at least one traversable section the SDSF line outside of the non-traversable section.

Traversing the at least one traversable part of the SDSF can optionally include heading the TD, operating at a first speed, towards the traversable part, turning the TD to travel along a line perpendicular to the traversable part, constantly correcting a heading of the TD based on the relationship between the heading and the perpendicular line, and driving the TD at a second speed by adjusting the first speed of the TD based at least on the heading and a distance between the TD and the traversable part. Traversing the at least one traversable part of the SDSF can optionally include if the SDSF is elevated relative to a surface of the travel route, traversing the SDSF by elevating the leading edge relative to the trailing edge and driving the TD at a third increased speed per degree of elevation, and driving the TD at a fourth speed until the TD has cleared the SDSF.

Traversing the at least one traversable part of the SDSF can alternatively optionally include (a) ignoring updated of the SDSF information and driving the TD at a pre-selected speed if a heading error is less than a third pre-selected amount with respect to a line perpendicular to the SDSF line, (b) driving the TD forward and increasing the speed of the TD to an eighth pre-selected speed per degree of elevation if an elevation of a front part of the TD relative to a rear part of the TD is between a sixth pre-selected amount and a fifth pre-selected amount, (c) driving the TD forward at a seventh pre-selected speed if the front part is elevated less than a sixth pre-selected amount relative to the rear part, and (d) repeating steps (a)-(d) if the rear part is less than or equal to a fifth pre-selected distance from the SDSF line.

In some configurations, the SDSF and the wheels of the TD can be automatically aligned to avoid system instability. Automatic alignment can be implemented by, for example, but not limited to, continually testing for and correcting the heading of the TD as the TD approaches the SDSF. Another aspect of the SDSF traversal feature of the present teachings is that the SDSF traversal feature automatically confirms that sufficient free space exists around the SDSF before attempting traversal. Yet another aspect of the SDSF traversal feature of the present teachings is that traversing SDSFs of varying geometries is possible. Geometries can include, for example, but not limited to, squared and contoured SDSFs. The orientation of the TD with respect to the SDSF can determine in what speed and direction the TD proceeds. The SDSF traversal feature can adjust the speed of the TD in the vicinity of SDSFs. When the TD ascends the SDSF, the speed can be increased to assist the TD in traversing the SDSF.

BRIEF DESCRIPTION OF THE DRAWINGS

The present teachings will be more readily understood by reference to the following description, taken with the accompanying drawings, in which:

FIGS. 11A and 11B are pictorial diagrams of the polygon processing of the present teachings;

FIGS. 18A-18E are flowcharts of the method of the present teachings for traversing SDSFs;

DETAILED DESCRIPTION

The SDSF traversal feature of the present teachings can leverage a TD, for example, but not limited to, an autonomous device or a semi-autonomous device, to navigate in environments that can include features such as SDSFs. The SDSF traversal feature can enable the TD to travel on an expanded variety of surfaces. In particular, SDSFs can be accurately identified and labeled so that the TD can automatically maintain the performance of the TD during ingress and egress of the SDSF, and the TD speed, mode, and direction can be controlled for safe SDSF traversal.

Figure 1:
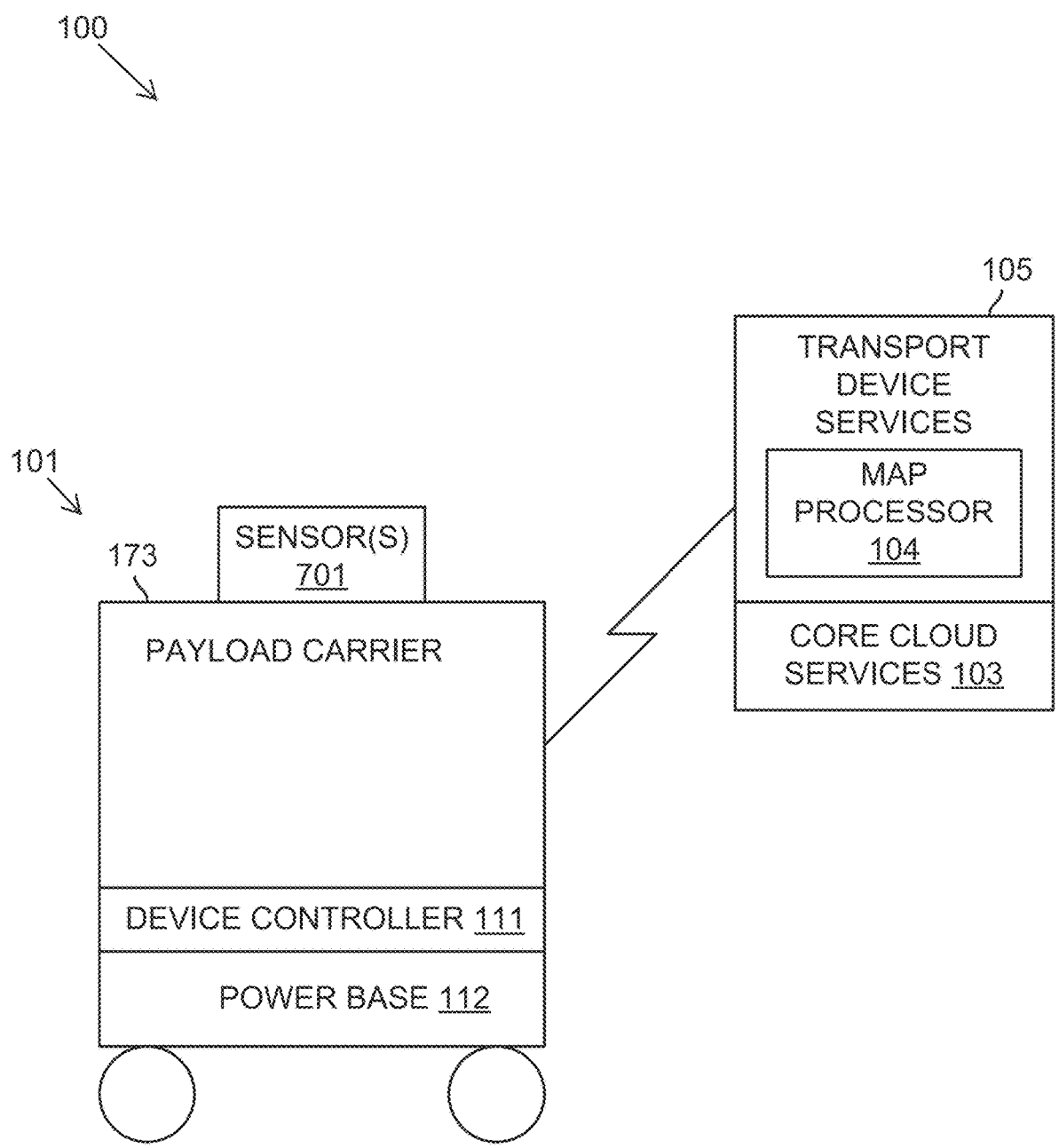
FIG. 1 is a schematic block diagram of the system of the present teachings for preparing a travel path for the TD.

Referring now to FIG. 1, system 100 for managing the traversal of SDSFs can include TD 101, core cloud infrastructure 103, TD services 105, device controller 111, sensor(s) 701, and power base 112. TD 101 can transport, for example, but not limited to, goods and/or people, from an origin to a destination, following a dynamically-determined path, as modified by incoming sensor information. TD 101 can include, but is not limited to including, devices that have autonomous modes, devices that can operate entirely autonomously, devices that can be operated at least partially remotely, and devices that can include a combination of those features. TD services 105 can provide drivable surface information including features to device controller 111. Device controller 111 can modify the drivable surface information at least according to, for example, but not limited to, incoming sensor information and feature traversal requirements, and can choose a path for TD 101 based on the modified drivable surface information. Device controller 111 can present commands to power base 112 that can direct power base 112 to provide speed, direction, and vertical movement commands to wheel motors and cluster motors, the commands causing TD 101 to follow the chosen path, and to raise and lower its cargo accordingly. TD services 105 can access route-related information from core cloud infrastructure 103, which can include, but is not limited to including, storage and content distribution facilities. In some configurations, core cloud infrastructure 103 can include commercial products such as, for example, but not limited to, AMAZON WEB SERVICES®, GOOGLE CLOUD™, and ORACLE CLOUD®.

Figure 2:
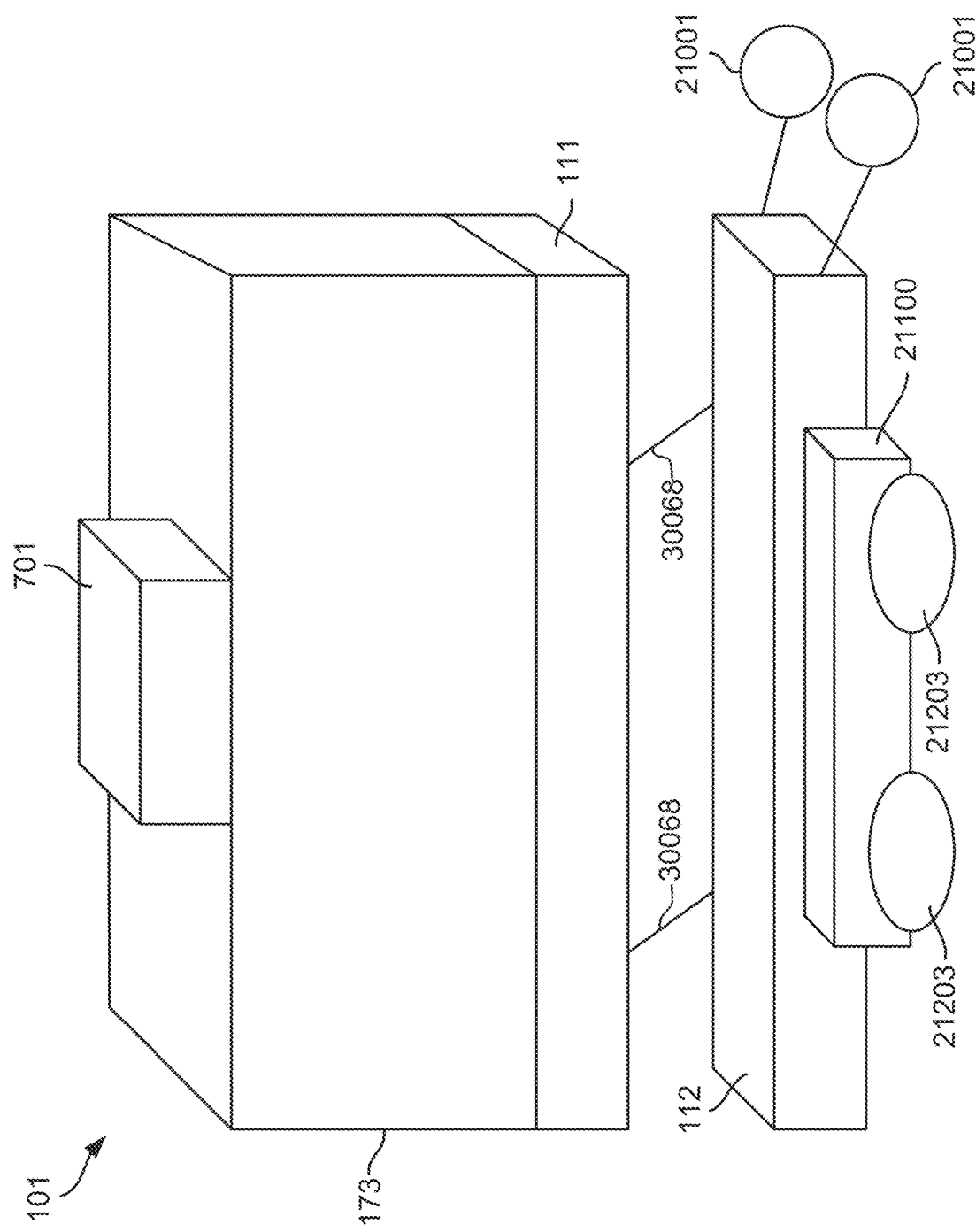
FIG. 2 is a pictorial diagram of an exemplary configuration of a device incorporating the system of the present teachings.

Referring now to FIG. 2, an exemplary TD that can include device controller 111 (FIG. 1) and map processor 104 (FIG. 1) of the present teachings can include a power base assembly such as, for example, but not limited to, the power base that is described fully in, for example, but not limited to, U.S. patent application Ser. No. 16/035,205, filed on Jul. 13, 2018, entitled Mobility Device, or U.S. Pat. No. 6,571,892, filed on Aug. 15, 2001, entitled Control System and Method, both of which are incorporated herein by reference in their entirety. An exemplary power base assembly is described herein not to limit the present teachings but instead to clarify features of any power base assembly that could be useful in implementing the technology of the present teachings. An exemplary power base assembly can optionally include power base 112, wheel cluster assembly 21100, and payload carrier height assembly 30068. An exemplary power base assembly can optionally provide the electrical and mechanical power to drive wheels 21203 and clusters 21100 that can raise and lower wheels 21203. Power base 112 can control the rotation of cluster assembly 21100 and the lift of payload carrier height assembly 30068 to support the substantially discontinuous surface traversal of the present teachings. Other such devices can be used to accommodate the SDSF detection and traversal of the present teachings.

Continuing to refer to FIG. 1, in some configurations, sensors internal to an exemplary power base can detect the orientation and rate of change in orientation of TD 101, motors can enable servo operation, and controllers can assimilate information from the internal sensors and motors. Appropriate motor commands can be computed to achieve transporter performance and to implement the path following commands. Left and right wheel motors can drive wheels on the either side of TD 101 (FIG. 1). In some configurations, front and back wheels can be coupled to drive together, so that two left wheels can drive together and two right wheels can drive together. In some configurations, turning can be accomplished by driving left and right motors at different rates, and a cluster motor can rotate the wheelbase in the fore/aft direction. This can allow TD 101 to remain level while front wheels become higher or lower than rear wheels. This feature can be useful when, for example, but not limited to, climbing up and down SDSFs. Payload carrier 173 can be automatically raised and lowered based at least on the underlying terrain.

Continuing to refer to FIG. 1, in some configurations, point cloud data can include route information for the area in which TD 101 is to travel. Point cloud data, possibly collected by a mapping device similar or identical to TD 101, can be time-tagged. The path along which the mapping device travels can be referred to as a mapped trajectory. Point cloud data processing that is described herein can happen as a mapping device traverses the mapped trajectory, or later after point cloud data collection is complete. After the point cloud data are collected, they can be subjected to point cloud data processing that can include initial filtering and point reduction, point cloud segmentation, and feature detection as described herein. In some configurations, core cloud infrastructure 103 can provide long- or short-term storage for the collected point cloud data, and can provide the data to TD services 105. TD services 105 can select among possible point cloud datasets to find the dataset that covers the territory surrounding a desired starting point for TD 101 and a desired destination for TD 101. TD services 105 can include, but are not limited to including, map processor 104 that can reduce the size of point cloud data and determine the features represented in the point cloud data. In some configurations, map processor 104 can determine the location of SDSFs from point cloud data. In some configurations, polygons can be created from the point cloud data as a technique to segment the point cloud data and to ultimately set a drivable surface. In some configurations, SDSF finding and drivable surface determination can proceed in parallel. In some configurations, SDSF finding and drivable surface determination can proceed sequentially.

Figure 3:
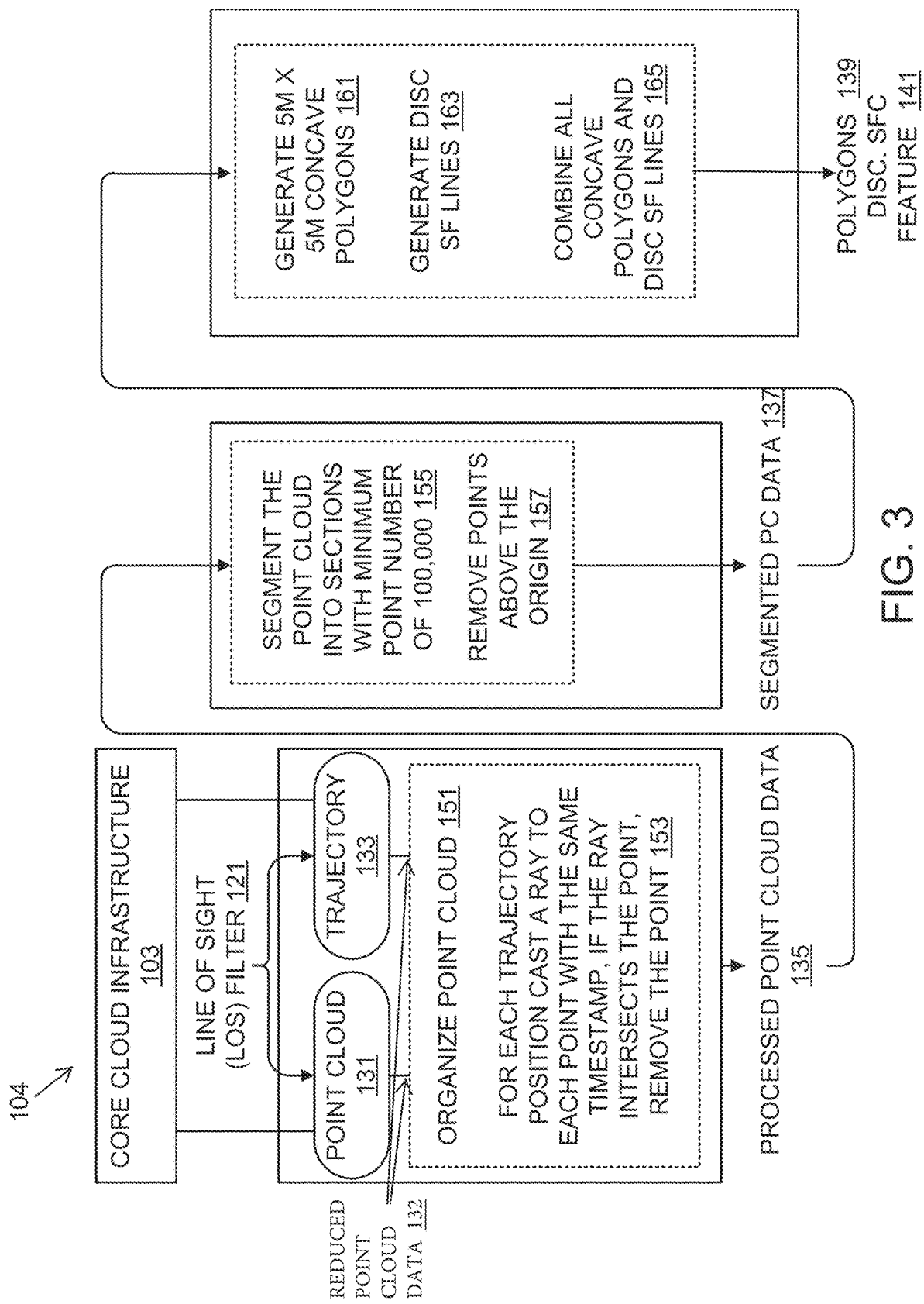
FIG. 3 is a schematic block diagram of the map processor of the present teachings.

Referring now to FIG. 3, in some configurations, map processor 104 can include, but is not limited to including, feature extraction that can include line of sight filtering 121 of point cloud data 131 and mapped trajectory 133. Line of sight filtering can remove points that are hidden from the direct line of sight of the sensors collecting the point cloud data and forming the mapped trajectory. Reduced point cloud data 132 can be further processed by organizing 151 reduced point cloud data 132 according to pre-selected criteria possibly associated with a specific feature. In some configurations, organized point cloud data and mapped trajectory 133 can be further processed by removing 153 transient points by any number of methods, including the method described herein. Transient points can complicate processing, in particular if the specific feature is stationary. Processed point cloud data 135 can be split into processable chunks. In some configurations, processed point cloud data 135 can segment 155 processed point cloud data 135 into sections having a pre-selected minimum number of points for example, but not limited to, about 100,000 points. In some configurations, further point reduction based on pre-selected criteria that could be related to the features to be extracted. For example, if points above a certain height are unimportant to a locating a feature, those points could be deleted from the point cloud data. In some configurations, the height of at least one of the sensors collecting point cloud data could be considered an origin, and points above the origin could be removed from the point cloud data because, for example, the only points of interest are associated with surface features. After filtered point cloud data 135 have been segmented, forming segments 137, the remaining points can be divided into drivable surface sections and surface features can be located. In some configurations, locating drivable surfaces can include generating 161 polygons 139, for example, but not limited to, as described herein. In some configurations, locating surface features can include generating 163 SDSF lines 141, for example, but not limited to, as described herein. In some configurations, creating a dataset that can be further processed to generate the actual path that TD 101 (FIG. 1) can travel can include combining 165 polygons 139 and SDSFs 141.

Figure 4:
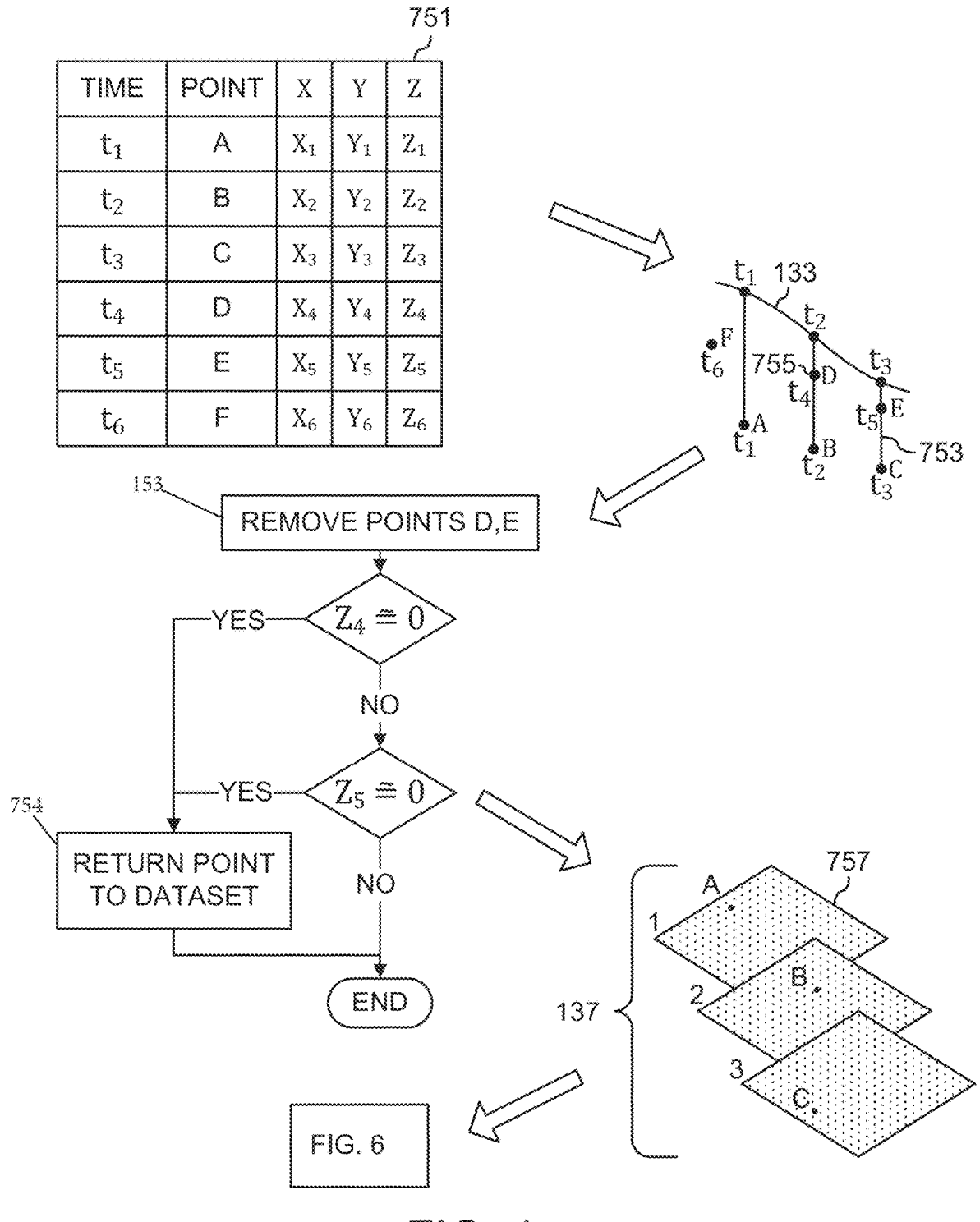
FIG. 4 is a pictorial diagram of the first part of the flow of the map processor of the present teachings.

Referring now primarily to FIG. 4, eliminating 153 (FIG. 3), from point cloud data 131 (FIG. 3), objects that are transient with respect to mapped trajectory 133, such as exemplary time-stamped points 751, can include casting ray 753 from time-stamped points on mapped trajectory 133 to each time-stamped point within point cloud data 131 (FIG. 3) that has substantially the same time stamp. If ray 753 intersects a point, for example, point D 755, between the time-stamped point on mapped trajectory 133 and the end point of ray 753, intersecting point D 755 can be assumed to have entered the point cloud data during a different sweep of the camera. The intersecting point, for example, intersecting point D 755, can be assumed to be a part of a transient object and can be removed from reduced point cloud data 132 (FIG. 3) as not representing a fixed feature such as a SDSF. The result is processed point cloud data 135 (FIG. 3), free of, for example, but not limited to, transient objects. Points that had been removed as parts of transient objects but also are substantially at ground level can be returned 754 to the processed point cloud data 135 (FIG. 3). Transient objects cannot include certain features such as, for example, but not limited to, SDSFs 141 (FIG. 3), and can therefore be removed without interfering with the integrity of point cloud data 131 (FIG. 3) when SDSFs 141 (FIG. 3) are the features being detected.

Figure 5:
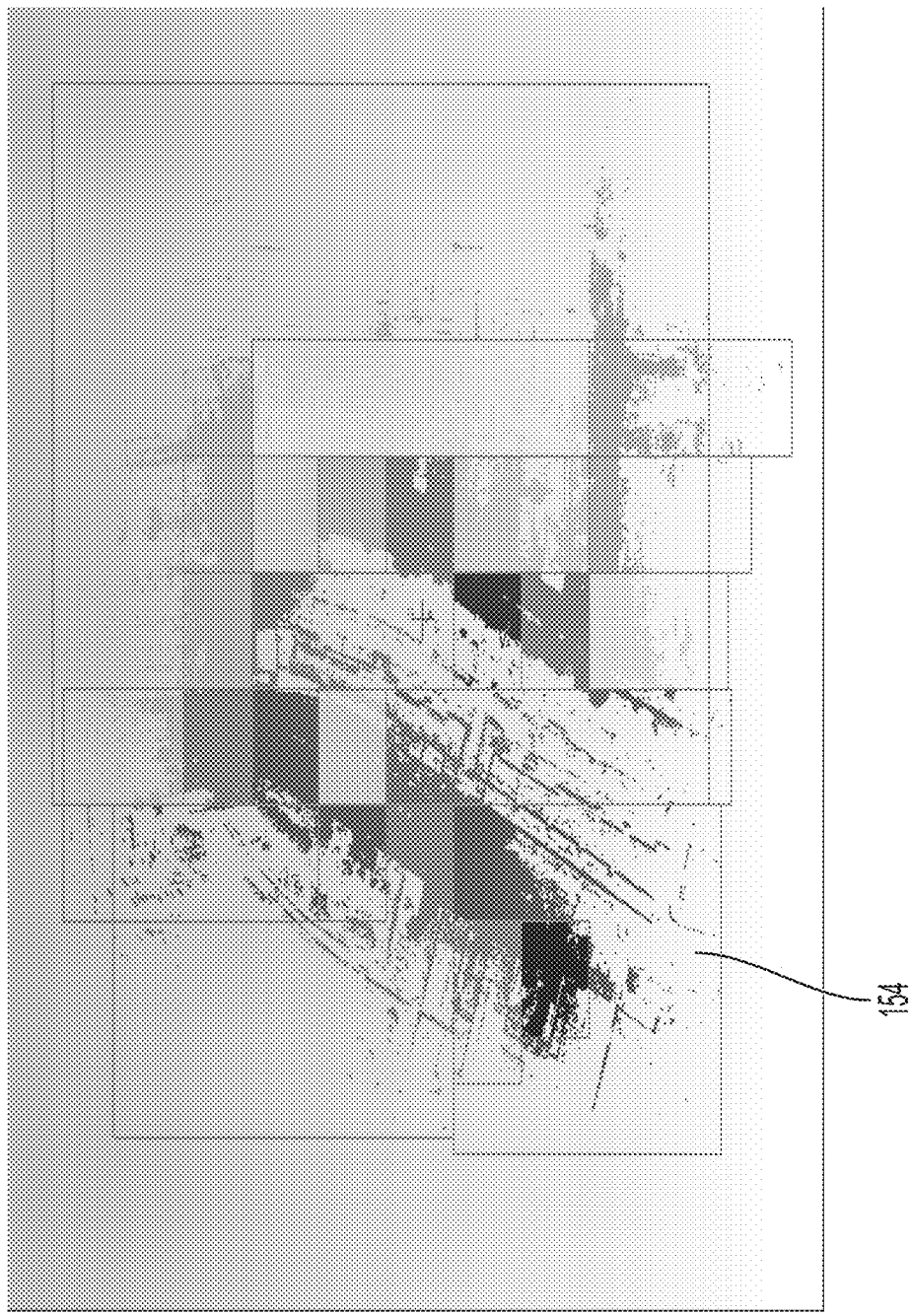
FIG. 5 is an image of the segmented point cloud of the present teachings.

Continuing to refer to FIG. 4, segmenting 155 (FIG. 3) processed point cloud data 135 (FIG. 3) into sections 757 can produce sections 757 having a pre-selected size and shape, for example, but not limited to, squares 154 (FIG. 5) having a minimum pre-selected side length and including about 100,000 points. From each section 757, points that are not necessary for the specific task, for example, but not limited to, points that lie above a pre-selected point, can be removed 157 (FIG. 3) to reduce the dataset size. In some configurations, the pre-selected point can be the height of TD 101 (FIG. 1). Removing these points can lead to more efficient processing of the dataset.

Referring again primarily to FIG. 3, map processor 104 can supply to device controller 111 at least one dataset that can be used to produce direction, speed, and height commands to TD 101 (FIG. 1). The at least one dataset can include points that can be connected to other points in the dataset, where each of the lines that connects points in the dataset traverses a drivable surface. To determine such route points, segmented point cloud data 137 can be divided into polygons 139, and the vertices of polygons 139 can possibly become the route points. Polygons 139 can include the features such as, for example, SDSFs 141.

Figure 6:
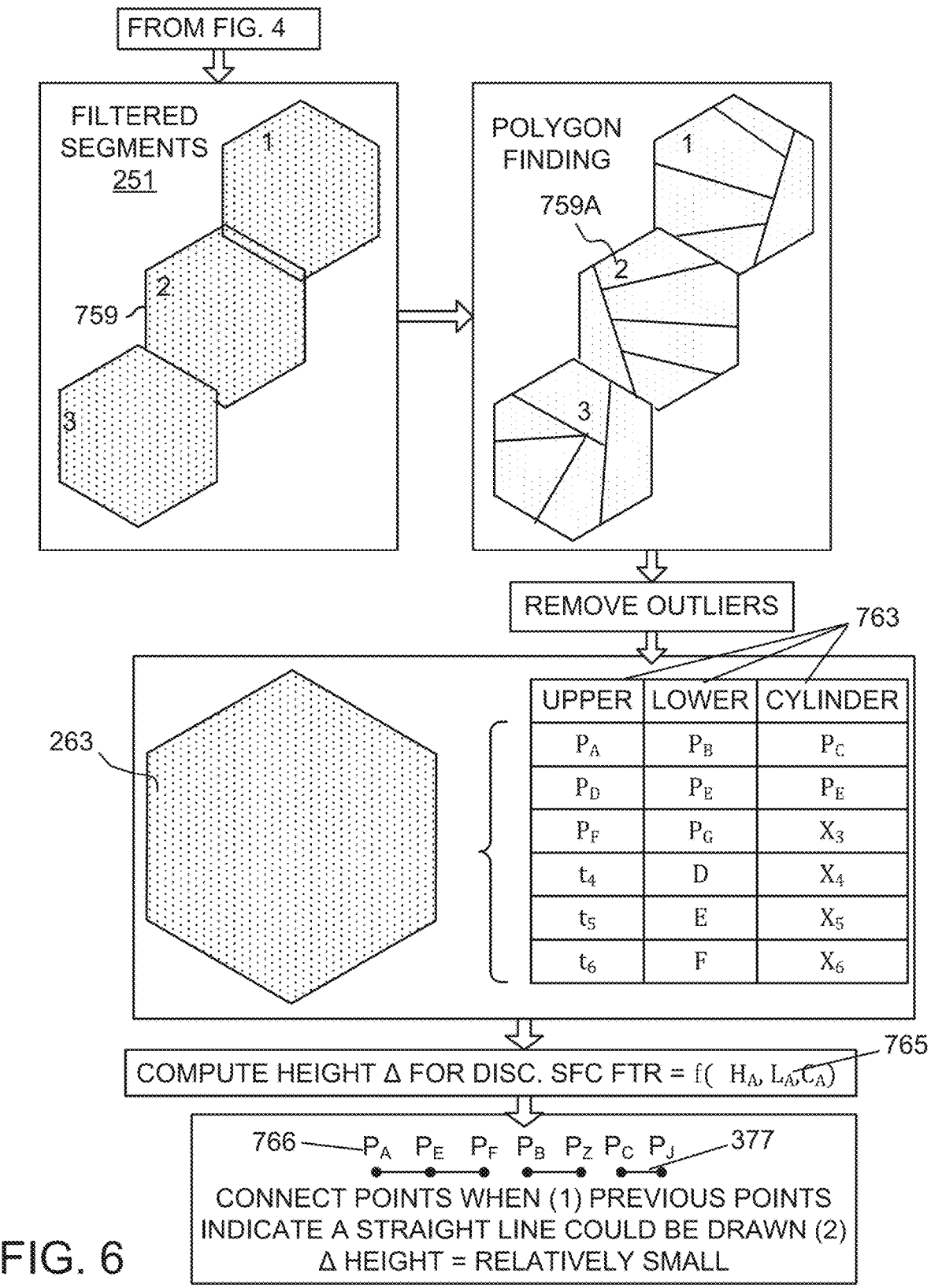
FIG. 6 is a pictorial diagram of the second part of the map processor of the present teachings.

Referring now primarily to FIG. 6, in some configurations, point cloud data 131 (FIG. 3) can be processed by removing outliers by conventional means such as, for example, but not limited to, statistical analysis techniques such as those available in the Point Cloud Library. Filtering can include downsizing segments 137 (FIG. 3) by conventional means including, but not limited to, a voxelized grid approach such as is available in the Point Cloud Library. Segmented point cloud data 137 (FIG. 3) can be used to generate 161 (FIG. 3) concave polygons 759, for example, 5 m×5 m polygons. Concave polygons 759 can be created, for example, but not limited to, by the process set out in *A New Concave Hull Algorithm and Concaveness Measure for n-dimensional Datasets*, Park et al., Journal of Information Science and Engineering 28, pp. 587-600, 2012.

Continuing to refer primarily to FIG. 6, in some configurations, creating processed point cloud data 135 (FIG. 3) can include filtering voxels. To reduce the number of points that will be subject to future processing, in some configurations, the centroid of each voxel in the dataset can be used to approximate the points in the voxel, and all points except the centroid can be eliminated from the point cloud data. In some configurations, the center of the voxel can be used to approximate the points in the voxel. Other methods to reduce the size of filtered segments 251 can be used such as, for example, but not limited to, taking random point subsamples so that a fixed number of points, selected uniformly at random, can be eliminated from filtered segments 251.

Referring again to FIG. 3, in some configurations, creating processed point cloud data 135 can include computing the normals from the dataset from which outliers have been removed and which has been downsized through voxel filtering. Normals to each point in the filtered dataset can be used for various processing possibilities, including curve reconstruction algorithms. In some configurations, estimating and filtering normals in the dataset can include obtaining the underlying surface from the dataset using surface meshing techniques, and computing the normals from the surface mesh. In some configurations, estimating normals can include using approximations to infer the surface normals from the dataset directly, such as, for example, but not limited to, determining the normal to a fitting plane obtained by applying a total least squares method to the k nearest neighbors to the point. In some configurations, the value of k can be chosen based at least on empirical data. Filtering normals can include removing any normals that are more than about 45° from perpendicular to the x-y plane. In some configurations, a filter can be used to align normals in the same direction. If part of the dataset represents a planar surface, redundant information contained in adjacent normals can be filtered out by performing either random sub-sampling, or by filtering out one point out of a related set of points. In some configurations, choosing the point can include recursively decomposing the dataset into boxes until each box contains at most k points. A single normal can be computed from the k points in each box.

Continuing to refer to FIG. 3, in some configurations, creating processed point cloud data 135 can include growing regions within the dataset by clustering points that are geometrically compatible with the surface represented the dataset, and refining the surface as the region grows to obtain the best approximation of the largest number of points. Region growing can merge the points in terms of a smoothness constraint. In some configurations, the smoothness constraint can be determined empirically, for example, or can be based on a desired surface smoothness. In some configurations, the smoothness constraint can include a range of about $10\pi/180$ to about $20\pi/180$. The output of region growing is a set of point clusters, each point cluster being a set of points, each of which is considered to be a part of the same smooth surface. In some configurations, region growing can be based on the comparison of the angles between normals. Region growing can be accomplished by algorithms such as, for example, but not limited to, region growing segmentation.

Figure 7:
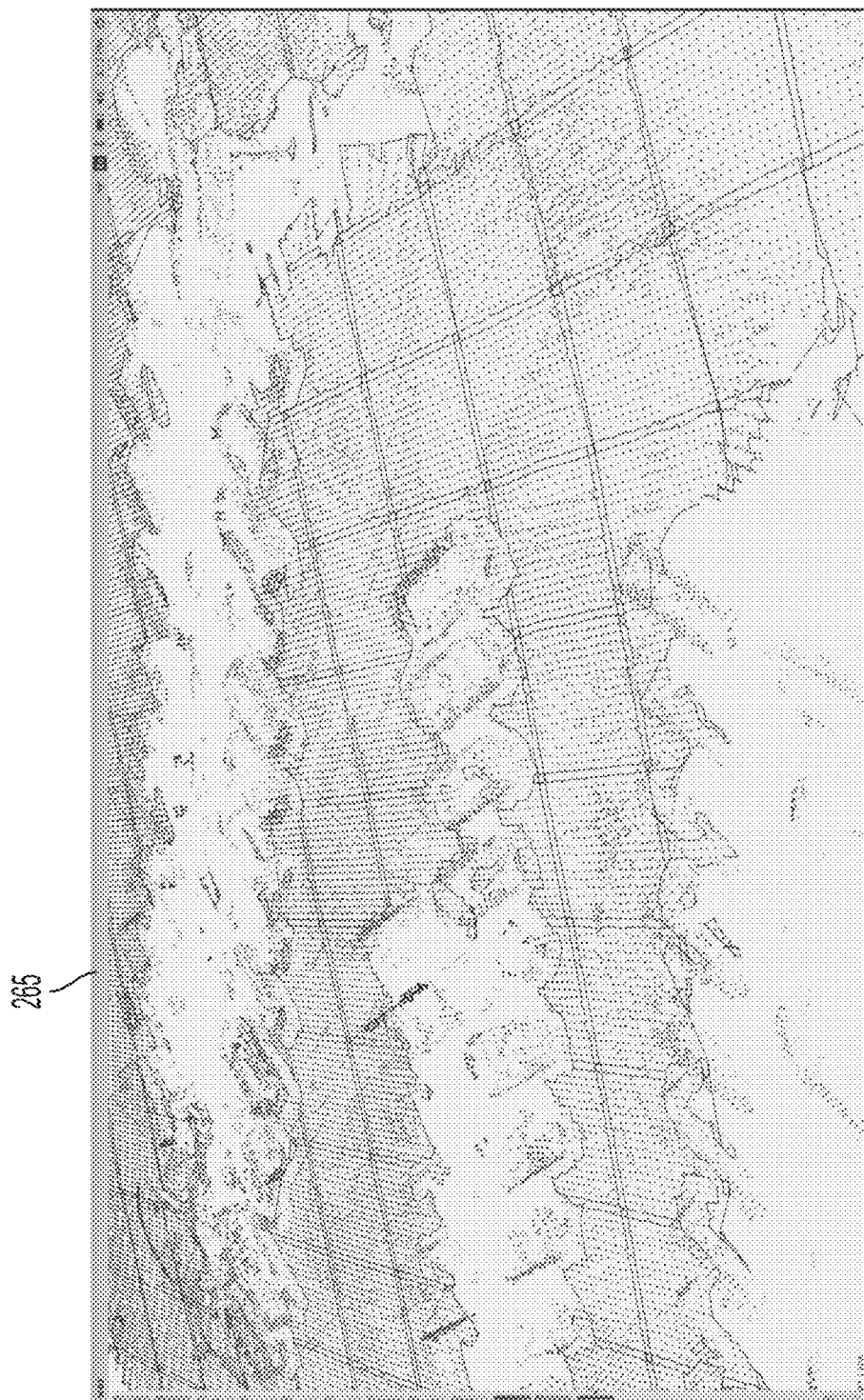
FIG. 7 is an image of the drivable surface detection result of the present teachings.

Referring now primarily to FIG. 7, in some configurations, processed point cloud data 135 (FIG. 3) can be used to determine initial drivable surface 265. Region growing can produce point clusters that can include points that are part of a drivable surface. In some configurations, to determine an initial drivable surface, a reference plane can be fit to each of the point clusters. In some configurations, the point clusters can be filtered according to a relationship between the orientation of the point clusters and the reference plane. For example, if the angle between the point cluster plane and the reference plane is less than, for example, but not limited to, about 30°, the point cluster can be deemed, preliminarily, to be part of an initial drivable surface. In some configurations, point clusters can be filtered based on, for example, but not limited to, a size constraint. In some configurations, point clusters that are greater in point size than about 20% of the total points in point cloud data 131 can be deemed too large, and point clusters that are smaller in size than about 0.1% of the total points in point cloud data 131 can be deemed too small. The initial drivable surface can include the filtered of the point clusters. In some configurations, point clusters can be split apart to continue further processing by any of several known methods. In some configurations, density based spatial clustering of applications with noise (DBSCAN) can be used to split the point clusters, while in some configurations, k-means clustering can be used to split the point clusters. DBSCAN can group together points that are closely packed together, and mark as outliers the points that are substantially isolated or in low-density regions. To be considered closely packed, the point must lie within a pre-selected distance from a candidate point. In some configurations, a scaling factor for the pre-selected distance can be empirically or dynamically determined. In some configurations, the scaling factor can be in the range of about 0.1 to 1.0.

Referring again primarily to FIG. 6, the resulting point sub-clusters can be converted into concave polygons 759 using meshing, for example. Meshing can be accomplished by, for example, but not limited to, standard methods such as marching cubes, marching tetrahedrons, surface nets, greedy meshing, and dual contouring. In some configurations, concave polygons 759 can be generated by projecting the local neighborhood of a point along the point's normal, and connecting unconnected points. Resulting concave polygons 759 can be based at least on the size of the neighborhood, the maximum acceptable distance for a point to be considered, the maximum edge length for the polygon, the minimum and maximum angles of the polygons, and the maximum deviation that normals can take from each other. In some configurations, concave polygons 759 can be filtered according to whether or not concave polygons 759 would be too small for TD 101 (FIG. 1) to transit. In some configurations, a circle the size of TD 101 (FIG. 1) can be dragged around each of concave polygons 759 by known means. If the circle falls substantially within concave polygon 759, then concave polygon 759, and thus the resulting drivable surface, can accommodate TD 101 (FIG. 1). In some configurations, the area of concave polygon 759 can be compared to the footprint of TD 101 (FIG. 1). Polygons can be assumed to be irregular so that a first step for determining the area of concave polygons 759 is to separate concave polygon 759 into regular polygons 759A by known methods. For each regular polygon 759A, standard area equations can be used to determine its size. The areas of each regular polygon 759A can be added together to find the area of concave polygon 759, and that area can be compared to the footprint of TD 101 (FIG. 1). Filtered concave polygons can include the subset of concave polygons that satisfy the size criteria. The filtered concave polygons can be used to set a final drivable surface.

Figure 8:
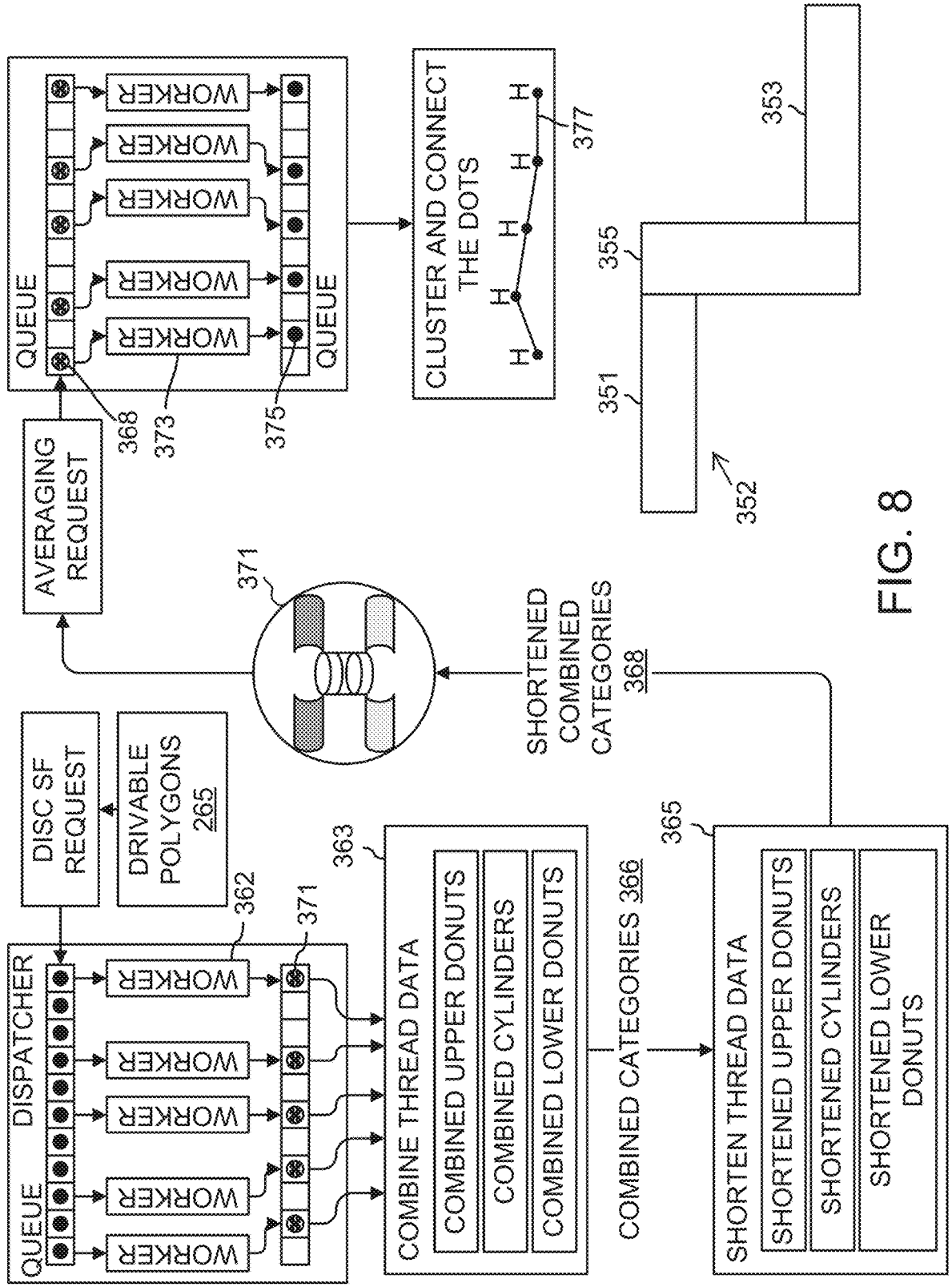
FIG. 8 is a pictorial diagram of the flow of the SDSF finder of the present teachings.
Figure 9:
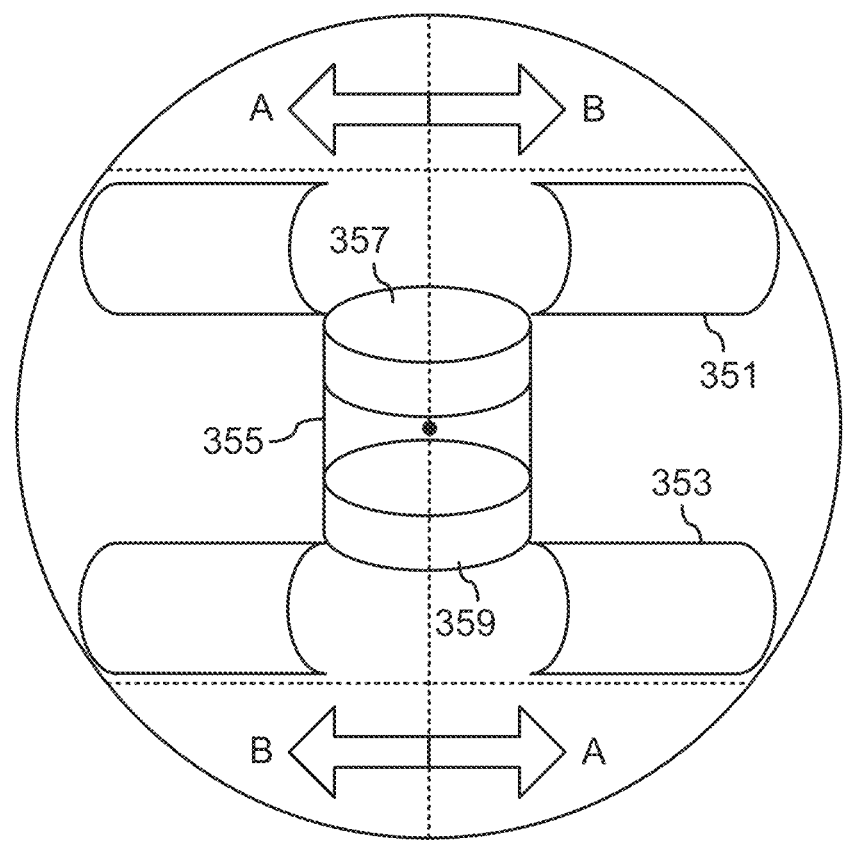
FIG. 9 is a pictorial diagram of the SDSF categories of the present teachings.

Referring primarily to FIG. 8, generating 163 (FIG. 3) SDSF lines can include locating SDSFs by further filtering of concave polygons 759 (FIG. 6). In some configurations, points from the point cloud data that make up the polygons can be categorized as either upper donut point 351 (FIG. 9), lower donut point 353 (FIG. 9), or cylinder point 355 (FIG. 9). Upper donut points 351 (FIG. 9) can fall into the shape of SDSF model 352 that is farthest from the ground. Lower donut points 353 (FIG. 9) fall into the shape of SDSF model 352 that is closest to the ground, or at ground level. Cylinder points 355 (FIG. 9) can fall into the shape between upper donut points 351 (FIG. 9) and lower donut points 353 (FIG. 9). The combination of categories can form donut 371. To determine if donuts 371 form a SDSF, certain criteria are tested. For example, in each donut 371 there must be a minimum number of points that are upper donut points 351 (FIG. 9) and a minimum number that are lower donut points 353 (FIG. 9). In some configurations, the minima can be selected empirically and can fall into the range of about 5-20. Each donut 371 can be divided into multiple parts, for example, two hemispheres. Another criterion for determining if the points in donut 371 represent a SDSF is whether the majority of the points lie in opposing hemispheres of the parts of donut 371. Cylinder points 355 (FIG. 9) can occur in either first cylinder region 357 (FIG. 9) or second cylinder region 359 (FIG. 9). Another criterion for SDSF selection is that there must be a minimum number of points in both cylinder regions 357/359 (FIG. 9). In some configurations, the minimum number of points can be selected empirically and can fall into the range of 3-20. Another criterion for SDSF selection is that donut 371 must include at least two of the three categories of points, i.e. upper donut point 351 (FIG. 9), lower donut point 353 (FIG. 9), and cylinder point 355 (FIG. 9).

Figure 10:
FIG. 10 is an image of the SDSFs identified by the system of the present teachings.

Continuing to refer primarily to FIG. 8, in some configurations, polygons can be processed in parallel. Each category worker 362 can search its assigned polygon for SDSF points 789 (FIG. 12) and can assign SDSF points 789 (FIG. 12) to categories 763 (FIG. 6). As the polygons are processed, the resulting point categories 763 (FIG. 6) can be combined 363 forming combined categories 366, and the categories can be shortened 365 forming shortened combined categories 368. Shortening SDSF points 789 (FIG. 12) can include filtering SDSF points 789 (FIG. 12) with respect to their distances from the ground. Shortened combined categories 368 can be averaged, possibly processed in parallel by average workers 373, by searching an area around each SDSF point 766 (FIG. 6) and generating average points 765 (FIG. 6), the category's points forming a set of averaged donuts 375. In some configurations, the radius around each SDSF point 766 (FIG. 6) can be determined empirically. In some configurations, the radius around each SDSF point 766 (FIG. 6) can include a range of between 0.1 m to 1.0 m. The height change between one point and another on SDSF trajectory 377 (FIG. 6) for the SDSF at average point 765 (FIG. 6) can be calculated. Connecting averaged donuts 375 together can generate SDSF trajectory 377 (FIG. 6). In creating SDSF trajectory 377 (FIGS. 6 and 10), if there are two next candidate points within a search radius of the starting point, the next point can be chosen based at least on forming a straight-as-possible line among previous line segments, the starting point and the candidate destination point, and upon which the candidate next point represents the smallest change in SDSF height between previous points and the candidate next point. In some configurations, SDSF height can be defined as the difference between the height of upper donut 351 (FIG. 9) and lower donut 353 (FIG. 9).

Figure 11B:
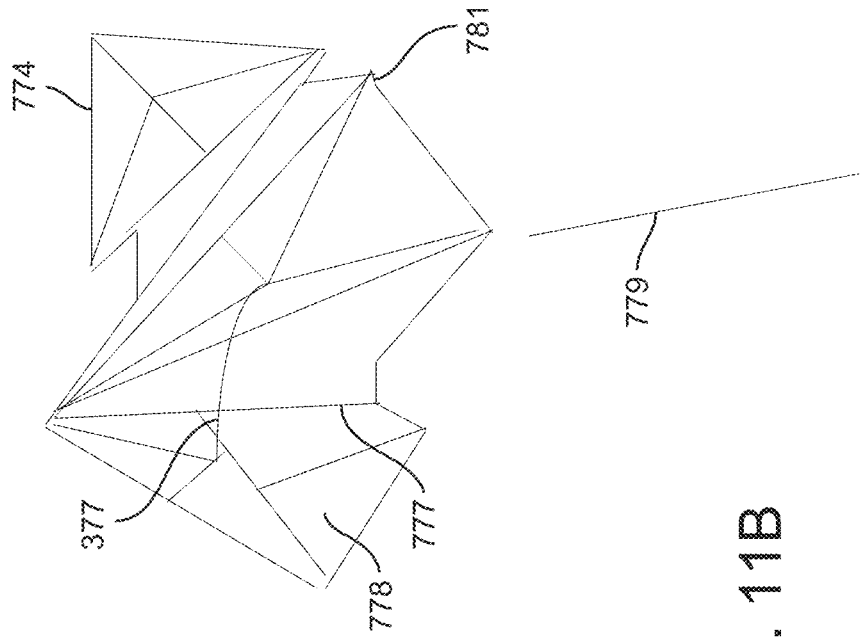
Figure 11B:
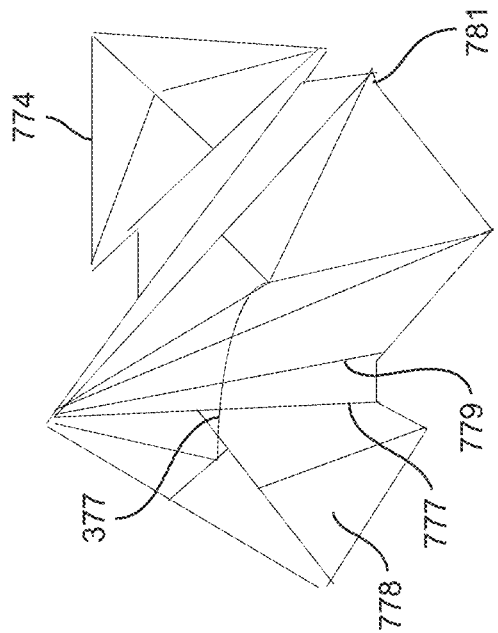

Referring now primarily to FIG. 11A, combining 165 (FIG. 3) concave polygons and SDSF lines can produce a dataset including polygons 139 (FIG. 3) and SDSFs 141 (FIG. 3), and the dataset can be manipulated to produce graphing polygons with SDSF data. Manipulating concave polygons 263 can include, but is not limited to including, merging concave polygons 263 to form merged polygon 771. Merging concave polygons 263 can be accomplished using known methods [[such as, for example, but not limited to, those found in (www.angusj.com/delphi/clipper.php)]]. Merged polygon 771 can be expanded to smooth the edges and form expanded polygon 772. Expanded polygon 772 can be contracted to provide a driving margin, forming contracted polygon 774, to which SDSF trajectories 377 (FIG. 11B) can be added. Inward trimming (contraction) can insure that there is room near the edges for TD 101 (FIG. 1) to travel by reducing the size of the drivable surface by a pre-selected amount based at least on the size of TD 101 (FIG. 1). Polygon expansion and contraction can be accomplished by commercially available technology such as, for example, but not limited to, the ARCGIS® clip command.

Referring now primarily to FIG. 11B, contracted polygon 774 can be partitioned into convex polygons 778, each of which can be traversed without encountering non-drivable surfaces. Contracted polygon 774 can be partitioned by conventional means such as, for example, but not limited to, ear slicing, optimized by z-order curve hashing and extended to handle holes, twisted polygons, degeneracies, and self-intersections. SDSF trajectory 377 can include SDSF points 789 (FIG. 15) that can be connected to polygon vertices 781. Vertices 781 can be considered to be possible path points that can be connected to each other to form possible travel paths for TD 101 (FIG. 1). In the dataset, SDSF points 789 can be labeled as such. As partitioning progresses, it is possible that redundant edges are introduced such as, for example, but not limited to, edges 777 and 779. Removing one of edges 777 or 779 can reduce the complexity of further analyses and can retain the convex polygon mesh. In some configurations, a Hertel-Mehlhorn polygon partitioning algorithm can be used to remove edges, skipping edges that have been labeled as features. The set of convex polygons 778, including the labeled features, can be subjected to further simplification to reduce the number of possible path points, and the possible path points can be provided to device controller 111 (FIG. 1) in the form of annotated point data 379 (FIG. 14).

Figure 13:
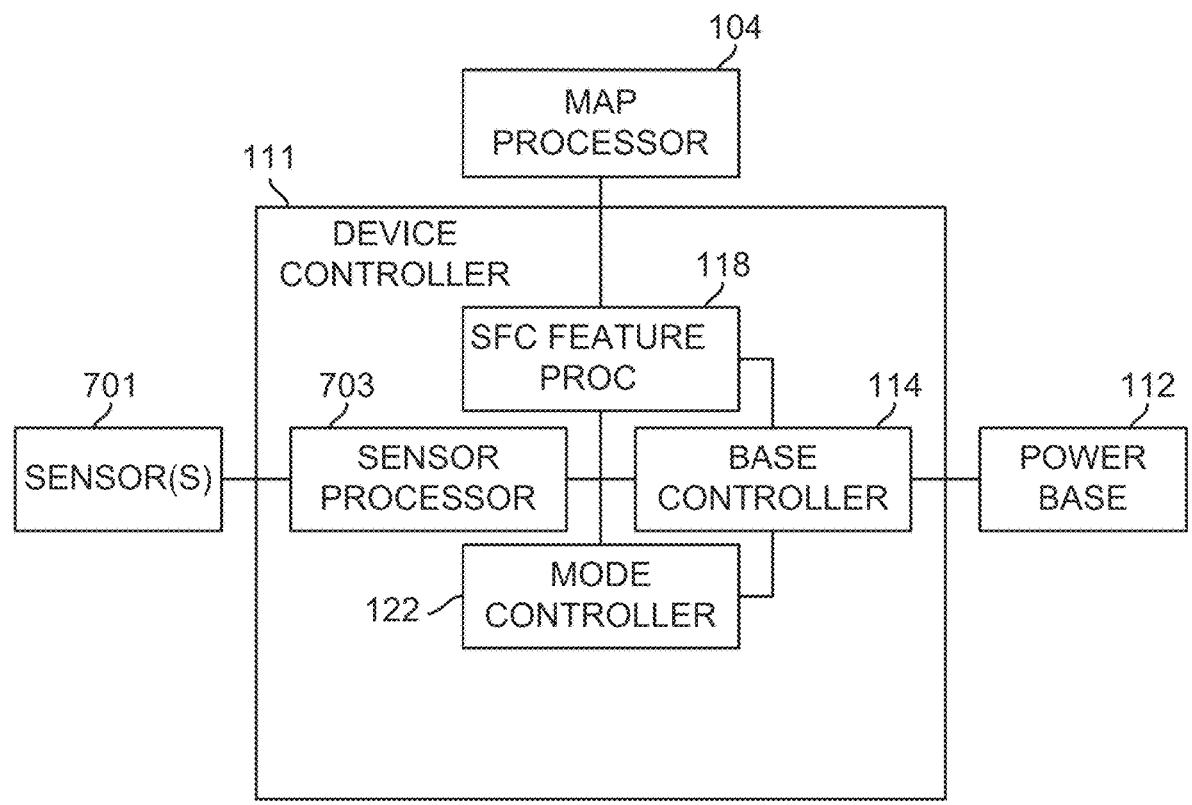
FIG. 13 is a schematic block diagram of the device controller of the present teachings.
Figure 15:
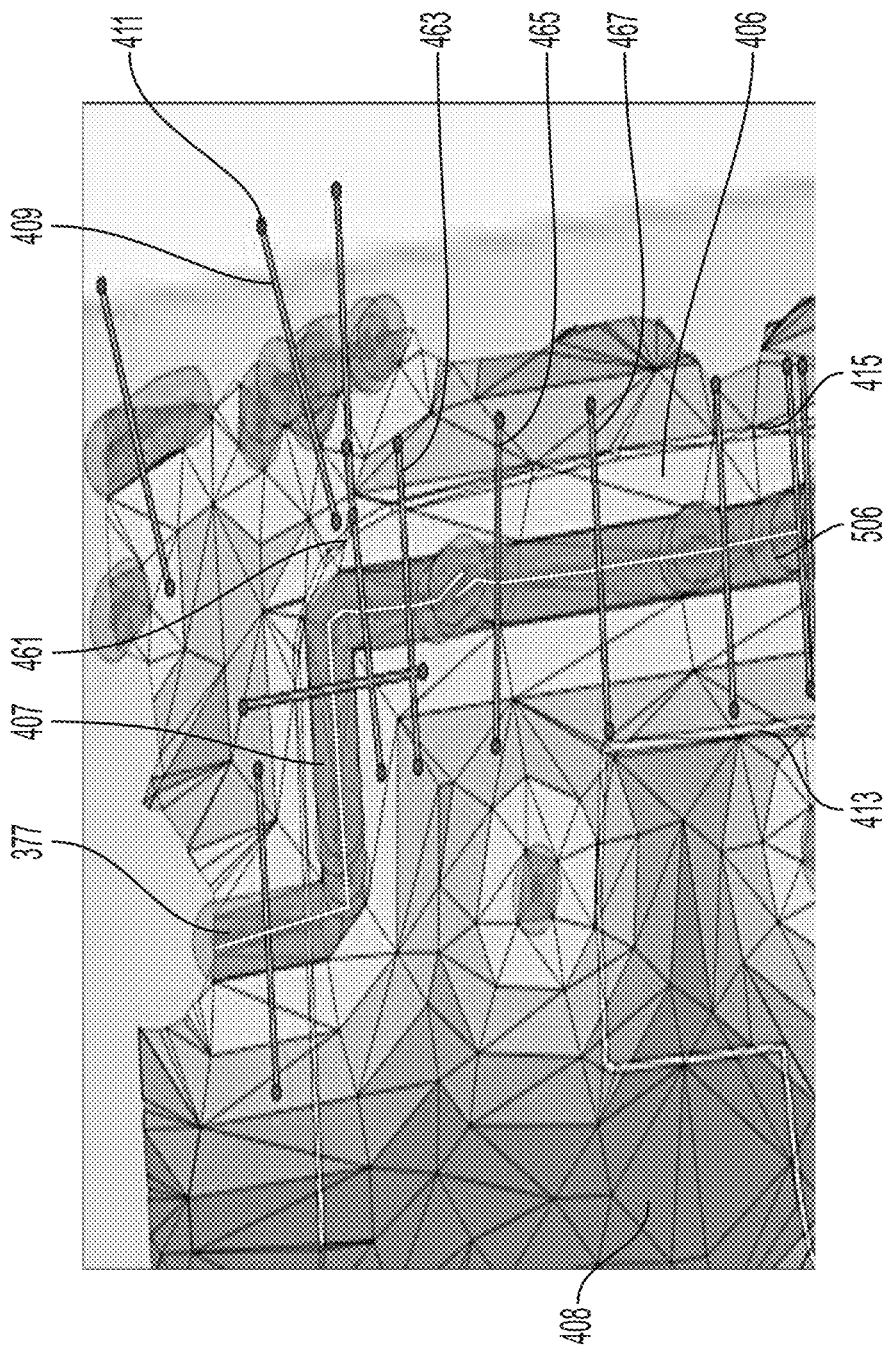
FIG. 15 is an image of the SDSF approaches identified by the system of the present teachings.
Figure 16:
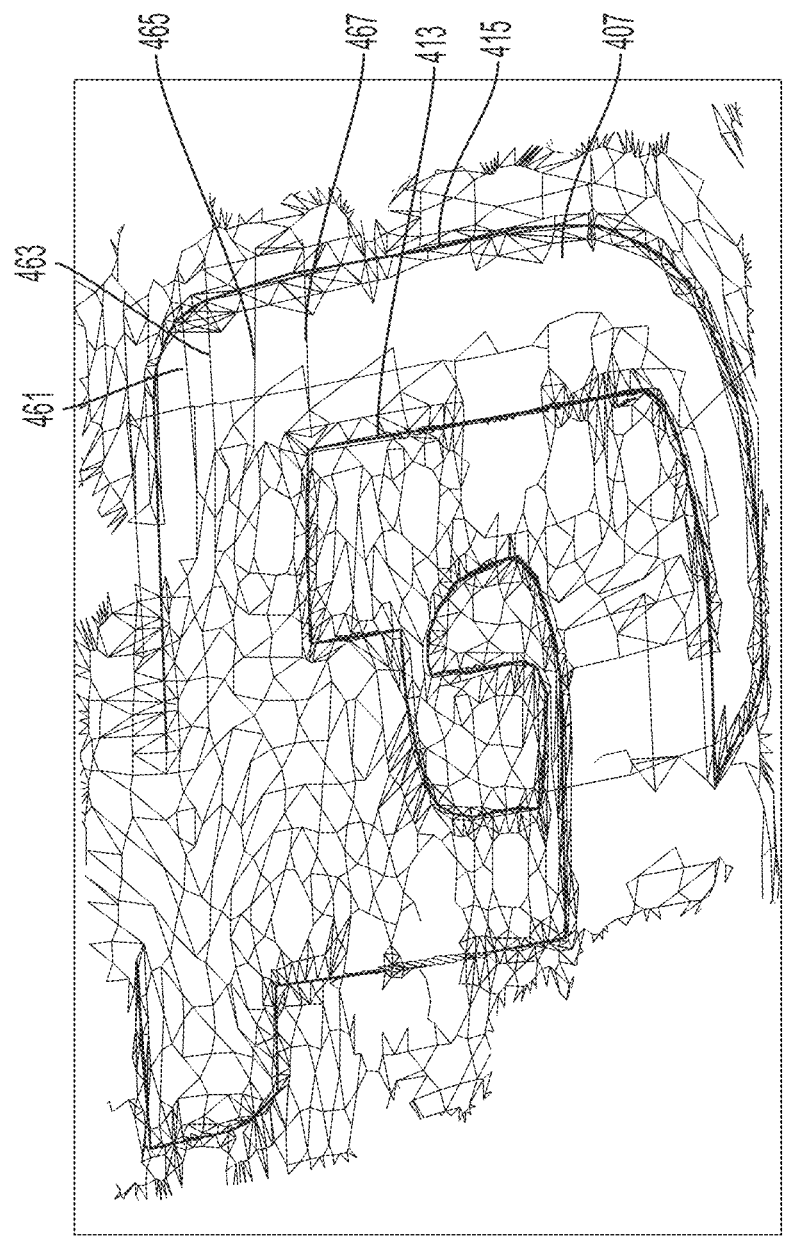
FIG. 16 is an image of the route topology created by the system of the present teachings.

Referring now primarily to FIG. 13, annotated point data 379 (FIG. 14) can be provided to device controller 111. Annotated point data 379 (FIG. 14), which can be the basis for route information that can be used to instruct TD 101 (FIG. 1) to travel a path, can include, but is not limited to including, navigable edges, a mapped trajectory such as, for example, but not limited to mapped trajectory 413/415 (FIG. 16), and labeled features such as, for example, but not limited to, SDSFs 377 (FIG. 15). Mapped trajectory 413/415 (FIG. 15) can include a graph of edges of the route space and initial weights assigned to parts of the route space. The graph of edges can include characteristics such as, for example, but not limited to, directionality and capacity, and edges can be categorized according to these characteristics. Mapped trajectory 413/415 (FIG. 15) can include cost modifiers associated with the surfaces of the route space, and drive modes associated with the edges. Drive modes can include, but are not limited to including, path following and SDSF climbing. Other modes can include operational modes such as, for example, but not limited to, autonomous, mapping, and waiting for intervention. Ultimately, the path can be selected based at least on lower cost modifiers. Topology that is relatively distant from mapped trajectory 413/415 (FIG. 15) can have higher cost modifiers, and can be of less interest when forming a path. Initial weights can be adjusted while TD 101 (FIG. 1) is operational, possibly causing a modification in the path. Adjusted weights can be used to adjust edge/weight graph 381 (FIG. 14), and can be based at least on the current drive mode, the current surface, and the edge category.

Continuing to refer to FIG. 13, device controller 111 can include a feature processor that can perform specific tasks related to incorporating the eccentricities of any features into the path. In some configurations, the feature processor can include, but is not limited to including, SDSF processor 118. In some configurations, device controller 111 can include, but is not limited to including, SDSF processor 118, sensor processor 703, mode controller 122, and base controller 114, each described herein. SDSF processor 118, sensor processor 703, and mode controller 122 can provide input to base controller 114.

Figure 14:
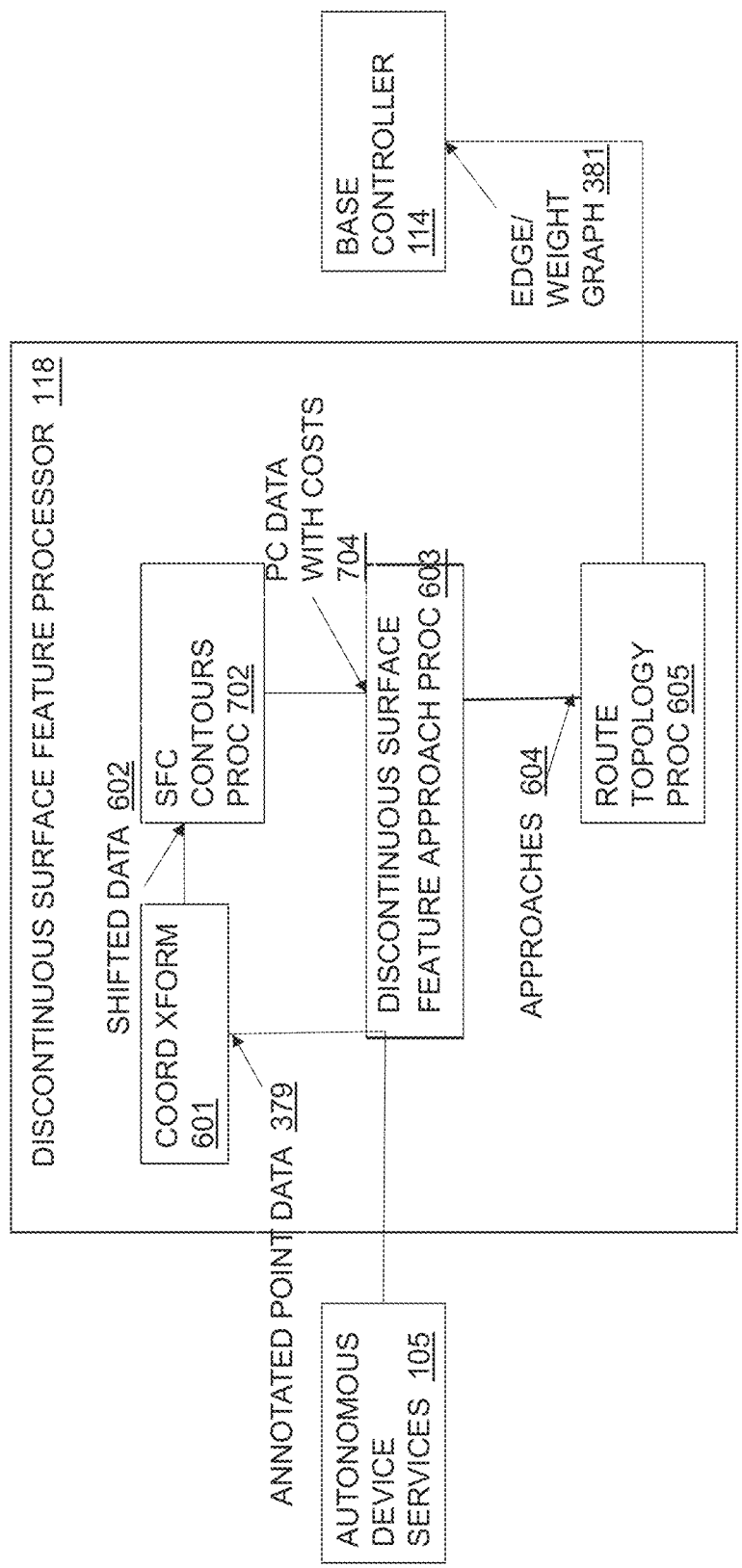
FIG. 14 is a schematic block diagram of the SDSF processor of the present teachings.

Continuing to refer to FIG. 13, base controller 114 can determine, based at least on the inputs provided by mode controller 122, SDSF processor 118, and sensor processor 703, information that power base 112 can use to drive TD 101 (FIG. 1) on a path determined by base controller 114 based at least on edge/weight graph 381 (FIG. 14). In some configurations, base controller 114 can insure that TD 101 (FIG. 1) can follow a pre-determined path from a starting point to a destination, and modify the pre-determined path based at least on external and/or internal conditions. In some configurations, external conditions can include, but are not limited to including, stoplights, SDSFs, and obstacles in or near the path being driven by TD 101 (FIG. 1). In some configurations, internal conditions can include, but are not limited to including, mode transitions reflecting the response that TD 101 (FIG. 1) makes to external conditions. Device controller 111 can determine commands to send to power base 112 based at least on the external and internal conditions. Commands can include, but are not limited to including, speed and direction commands that can direct TD 101 (FIG. 1) to travel the commanded speed in the commanded direction. Other commands can include, for example, groups of commands that enable feature response such as, for example, SDSF climbing. Base controller 114 can determine a desired speed between waypoints of the path by conventional methods, including, but not limited to, Interior Point Optimizer (IPOPT) large-scale nonlinear optimization. Base controller 114 can determine a desired path based at least on conventional technology such as, for example, but not limited to, technology based on Dykstra's algorithm, the A* search algorithm, or the Breadth-first search algorithm. Base controller 114 can form a box around mapped trajectory 413/415 (FIG. 15) to set an area in which obstacle detection can be performed. The height of the payload carrier, when adjustable, can be adjusted based at least in part on the directed speed.

Continuing to refer to FIG. 13, base controller 114 can convert speed and direction determinations to motor commands. For example, when a SDSF such as, for example, but not limited to, a curb or slope is encountered, base controller 114, in SDSF climbing mode, can direct power base 112 to raise payload carrier 173 (FIG. 2), align TD 101 (FIG. 1) at approximately a 90° angle with the SDSF, and reduce the speed to a relatively low level. When TD 101 (FIG. 1) climbs the substantially discontinuous surface, base controller 114 can direct power base 112 to transition to a climbing phase in which the speed is increased because increased torque is required to move TD 101 (FIG. 1) up an incline. When TD 101 (FIG. 1) encounters a relatively level surface, base controller 114 can reduce the speed in order to remain atop any flat part of the SDSF. When, in the case of a decline ramp associated with the flat part, TD 101 (FIG. 1) begins to descend the substantially discontinuous surface, and when both wheels are on the decline ramp, base controller 114 can allow speed to increase. When a SDSF such as, for example, but not limited to, a slope is encountered, the slope can be identified and processed as a structure. Features of the structure can include a pre-selected size of a ramp, for example. The ramp can include an approximate 30° degree incline, and can optionally, but not limited to, be on both sides of a plateau. Device controller 111 (FIG. 13) can distinguish between an obstacle and a slope by comparing the angle of the perceived feature to an expected slope ramp angle, where the angle can be received from sensor processor 703 (FIG. 13).

Figure 12:
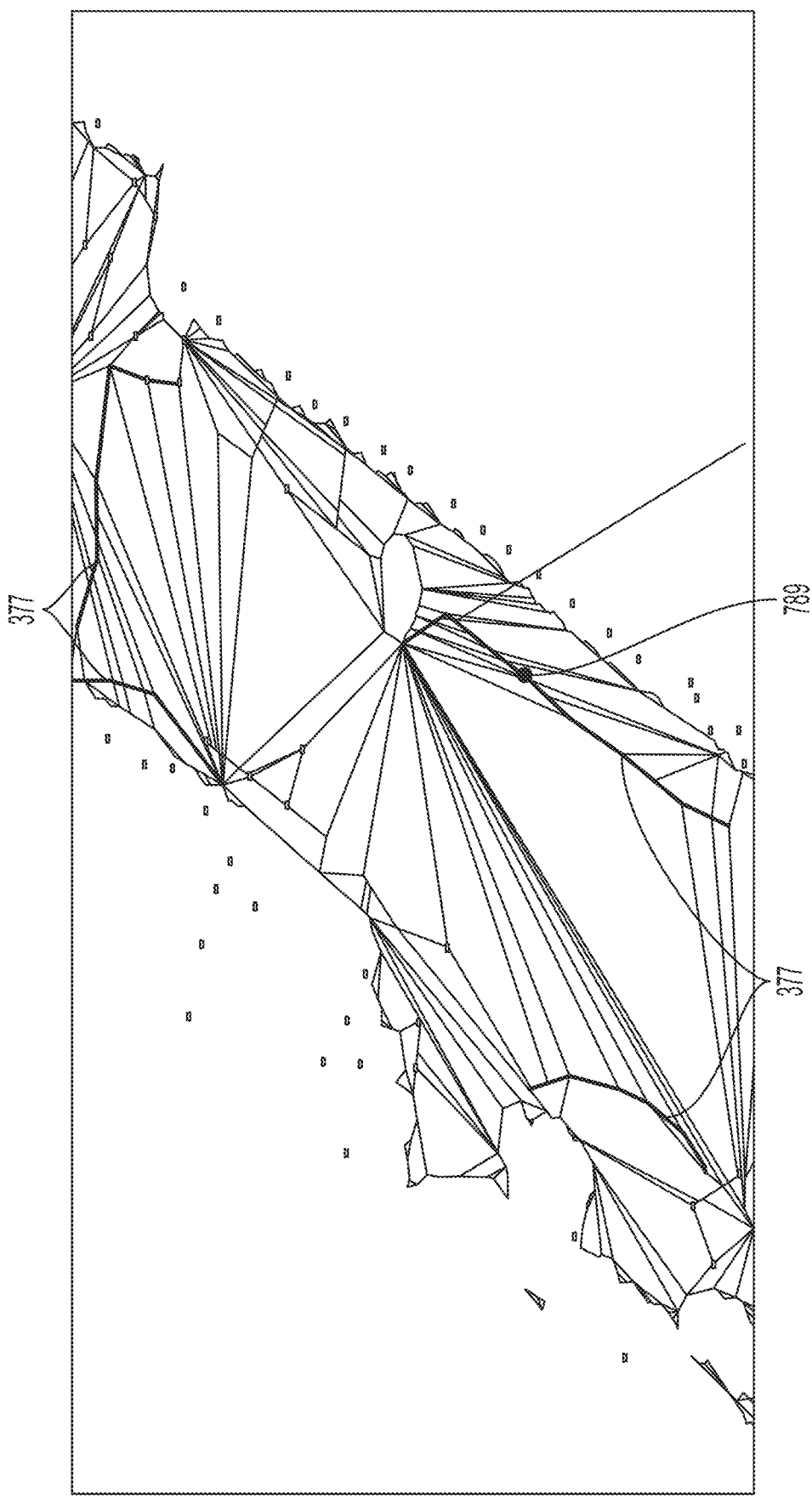
FIG. 12 is an image of the polygons and SDSFs identified by the system of the present teachings.

Referring now primarily to FIG. 14, SDSF processor 118 can locate, from the blocks of drivable surfaces formed by a mesh of polygons represented in annotated point data 379, navigable edges that can be used to create a path for traversal by TD 101 (FIG. 1). Within SDSF buffer 407 (FIG. 15), which can form an area of pre-selected size around SDSF line 377 (FIG. 15), navigable edges can be erased (see FIG. 16) in preparation for the special treatment given SDSF traversal. Closed line segments such as segment 409 (FIG. 15) can be drawn to bisect SDSF buffer 407 (FIG. 15) between pairs of the previously determined SDSF points 789 (FIG. 12). In some configurations, for a closed line segment to be considered as a candidate for SDSF traversal, segment ends 411 (FIG. 15) can fall in an unobstructed part of the drivable surface, there can be enough room for TD 101 (FIG. 1) to travel between adjacent SDSF points 789 (FIG. 12) along line segments, and the area between SDSF points 789 (FIG. 12) can be a drivable surface. Segment ends 411 (FIG. 15) can be connected to the underlying topology, forming vertices and drivable edges. For example, line segments 461, 463, 465, and 467 (FIG. 15) that met the traversal criteria are shown as part of the topology in FIG. 16. In contrast, line segment 409 (FIG. 15) did not meet the criteria at least because segment end 411 (FIG. 15) does not fall on a drivable surface. Overlapping SDSF buffers 506 (FIG. 15) can indicate SDSF discontinuity, which could weigh against SDSF traversal of the SDSFs within the overlapped SDSF buffers 506 (FIG. 15). SDSF line 377 (FIG. 15) can be smoothed, and the locations of SDSF points 789 (FIG. 12) can be adjusted so that they fall about a pre-selected distance apart, the pre-selected distance being based at least on the footprint of TD 101 (FIG. 1).

Continuing to refer to FIG. 14, SDSF processor 118 can transform annotated point data 379 into edge/weight graph 381, including topology modifications for SDSF traversal. SDSF processor 118 can include seventh processor 601, eighth processor 702, ninth processor 603, and tenth processor 605. Seventh processor 601 can transform the coordinates of the points in annotated point data 379 to a global coordinate system, to achieve compatibility with GPS coordinates, producing GPS-compatible dataset 602. Seventh processor 601 can use conventional processes such as, for example, but not limited to, affine matrix transform and PostGIS transform, to produce GPS-compatible dataset 602. The World Geodetic System (WGS) can be used as the standard coordinate system as it takes into account the curvature of the earth. The map can be stored in the Universal Transverse Mercator (UTM) coordinate system, and can be switched to WGS when it is necessary to find where specific addresses are located.

Referring now primarily to FIG. 15, eighth processor 702 (FIG. 14) can smooth SDSFs and determine the boundary of SDSF 377, create buffers 407 around the SDSF boundary, and increase the cost modifier of the surface the farther it is from a SDSF boundary. Mapped trajectory 413/415 can be a special case lane having the lowest cost modifier. Lower cost modifiers 406 can be generally located near the SDSF boundary, while higher cost modifiers 408 can be generally located relatively farther from the SDSF boundary. Eighth processor 702 can provide point cloud data with costs 704 (FIG. 14) to ninth processor 603 (FIG. 14).

Continuing to refer primarily to FIG. 15, ninth processor 603 (FIG. 14) can calculate approximately 90° approaches 604 (FIG. 14) for TD 101 (FIG. 1) to traverse SDSFs 377 that have met the criteria to label them as traversable. Criteria can include SDSF width and SDSF smoothness. Line segments, such as line segment 409 can be created such their length is indicative of a minimum ingress distance that TD 101 (FIG. 1) might require to approach SDSF 377, and a minimum egress distance that might be required to exit SDSF 377. Segment endpoints, such as endpoint 411, can be integrated with the underlying routing topology. The criteria used to determine if a SDSF approach is possible can eliminate some approach possibilities. SDSF buffers such as SDSF buffer 407 can be used to calculate valid approaches and route topology edge creation.

Referring again primarily to FIG. 14, tenth processor 605 can create edge/weight graph 381 from the topology, a graph of edges and weights, developed herein that can be used to calculate paths through the map. The topology can include cost modifiers and drive modes, and the edges can include directionality and capacity. The weights can be adjusted at runtime based on information from any number of sources. Tenth processor 605 can provide at least one sequence of ordered points to base controller 114, plus a recommended drive mode at particular points, to enable path generation. Each point in each sequence of points represents the location and labeling of a possible path point on the processed drivable surface. In some configurations, the labeling can indicate that the point represents part of a feature that could be encountered along the path, such as, for example, but not limited to, a SDSF. In some configurations, the feature could be further labeled with suggested processing based on the type of feature. For example, in some configurations, if the path point is labeled as a SDSF, further labeling can include a mode. The mode can be interpreted by TD 101 (FIG. 1) as suggested driving instructions for TD 101 (FIG. 1), such as, for example, switching TD 101 (FIG. 1) into SDSF climbing mode 100-31 (FIG. 17) to enable TD 101 (FIG. 1) to traverse SDSF 377 (FIG. 15).

Figure 17:
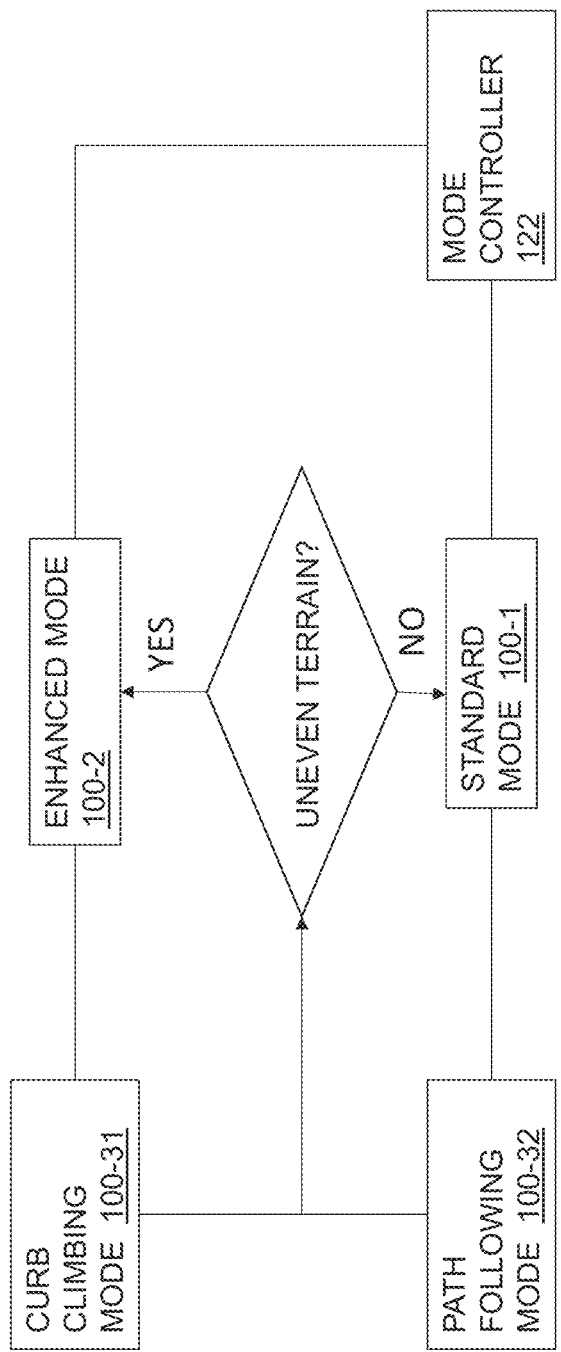
FIG. 17 is a schematic block diagram of the modes of the present teachings.

Referring now to FIG. 17, in some configurations, mode controller 122 can provide to base controller 114 (FIG. 13) directions to execute a mode transition. Mode controller 122 can establish the mode in which TD 101 (FIG. 1) is traveling. For example, mode controller 122 can provide to base controller 114 a change of mode indication, changing between, for example, path following mode 100-32 and SDSF climbing mode 100-31 when a SDSF is identified along the travel path. In some configurations, annotated point data 379 (FIG. 14) can include mode identifiers at various points along the route, for example, when the mode changes to accommodate the route. For example, if SDSF 377 (FIG. 15) has been labeled in annotated point data 379 (FIG. 14), device controller 111 can determine the mode identifier(s) associated with the route point(s) and possibly adjust the instructions to power base 112 (FIG. 13) based on the desired mode. In addition to SDSF climbing mode 100-31 and path following mode 100-32, in some configurations, TD 101 (FIG. 1) can support operating modes that can include, but are not limited to including, standard mode 100-1, which, in some configurations, can include driving two drive wheels and two caster wheels 21001 (FIG. 2), and enhanced mode 100-2. Enhanced mode 100-2, as described in detail in U.S. Pat. No. 6,571,892, entitled Control System and Method, issued on Jun. 3, 2003 ('892), incorporated herein by reference in its entirety, can provide support for traversal of uneven terrain, a variety of environments, steep inclines, and soft terrain by TD 101 (FIG. 1). In enhanced mode 100-2, all four drive wheels 21203 (FIG. 2) can be deployed. Driving four wheels 21203 (FIG. 2) and equalizing weight distribution on wheels 21203 (FIG. 2) can enable TD 101 (FIG. 1) to drive up and down steep slopes and through many types of outdoor environments including but not limited to, gravel, sand, snow, and mud. The height of payload carrier 173 (FIG. 2) can be adjusted to provide necessary clearance over obstacles and along slopes.

Figure 18A:
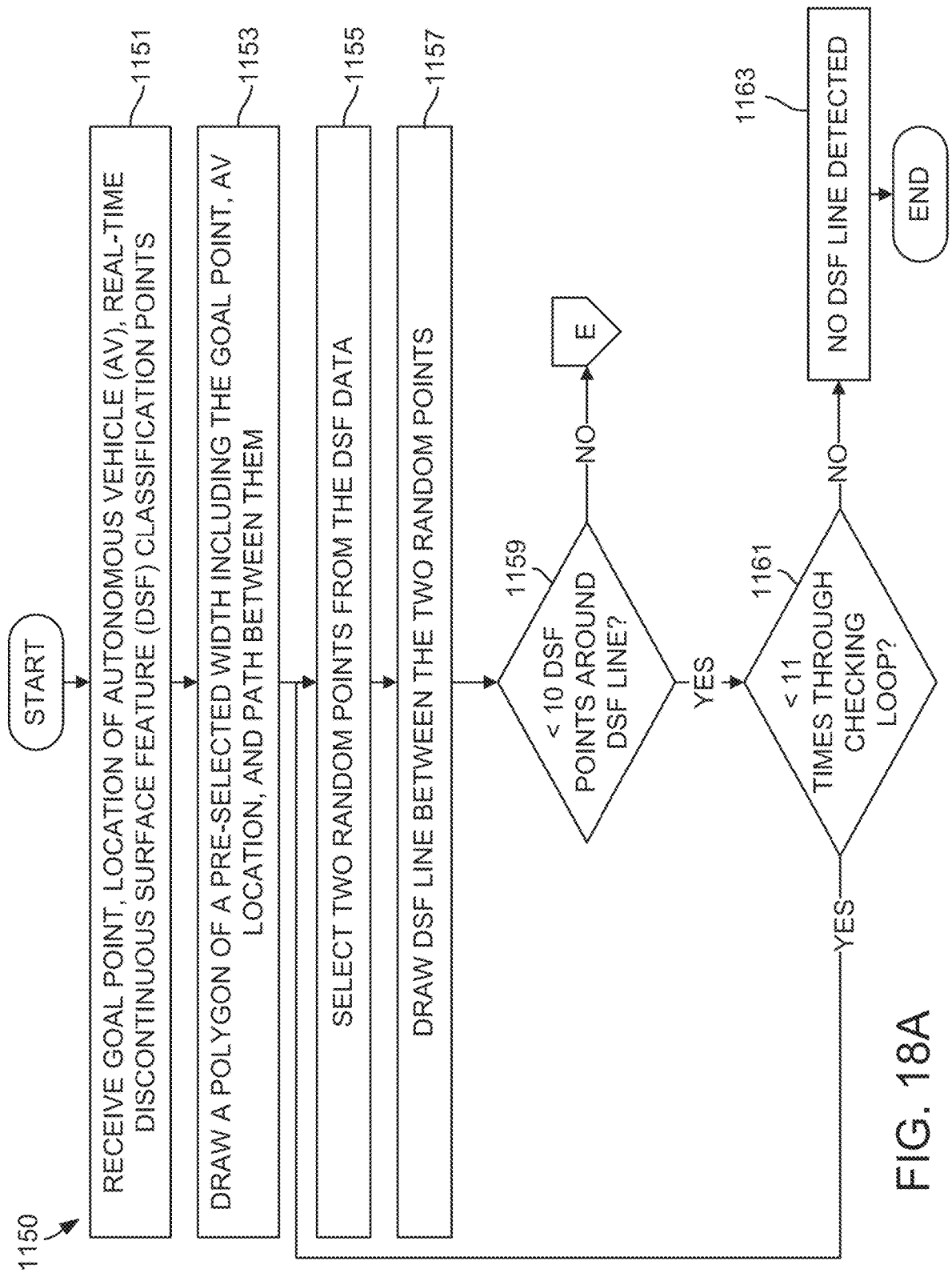

Referring now to FIG. 18A, method 1150 for navigating the TD towards a goal point across at least one SDSF can include, but is not limited to including, receiving 1151 SDSF information related to the SDSF, the location of the goal point, and the location of the TD. The SDSF information can include, but is not limited to including, a set of points each classified as SDSF points, and an associated probability for each point that the point is a SDSF point. Method 1150 can include drawing 1153 a closed polygon encompassing the location of the TD, the location of the goal point, and drawing a path line between the goal point and the location of the TD. The closed polygon can include a pre-selected width. Table I includes possible ranges for the pre-selected variables discussed herein. Method 1150 can include selecting 1155 two of the SDSF points located within the polygon and drawing 1157 a SDSF line between the two points. In some configurations, the selection of the SDSF points can be at random or any other way. If 1159 there are fewer than a first pre-selected number of points within a first pre-selected distance of the SDSF line, and if 1161 there have been less than a second pre-selected number of attempts at choosing SDSF points, drawing a line between them, and having fewer than the first pre-selected number of points around the SDSF line, method 1150 can include returning to step 1155. If 1161 there has been a second pre-selected number of attempts at choosing SDSF points, drawing a line between them, and having fewer than the first pre-selected number of points around the SDSF line, method 1150 can include noting 1163 that no SDSF line was detected.

Figure 18B:
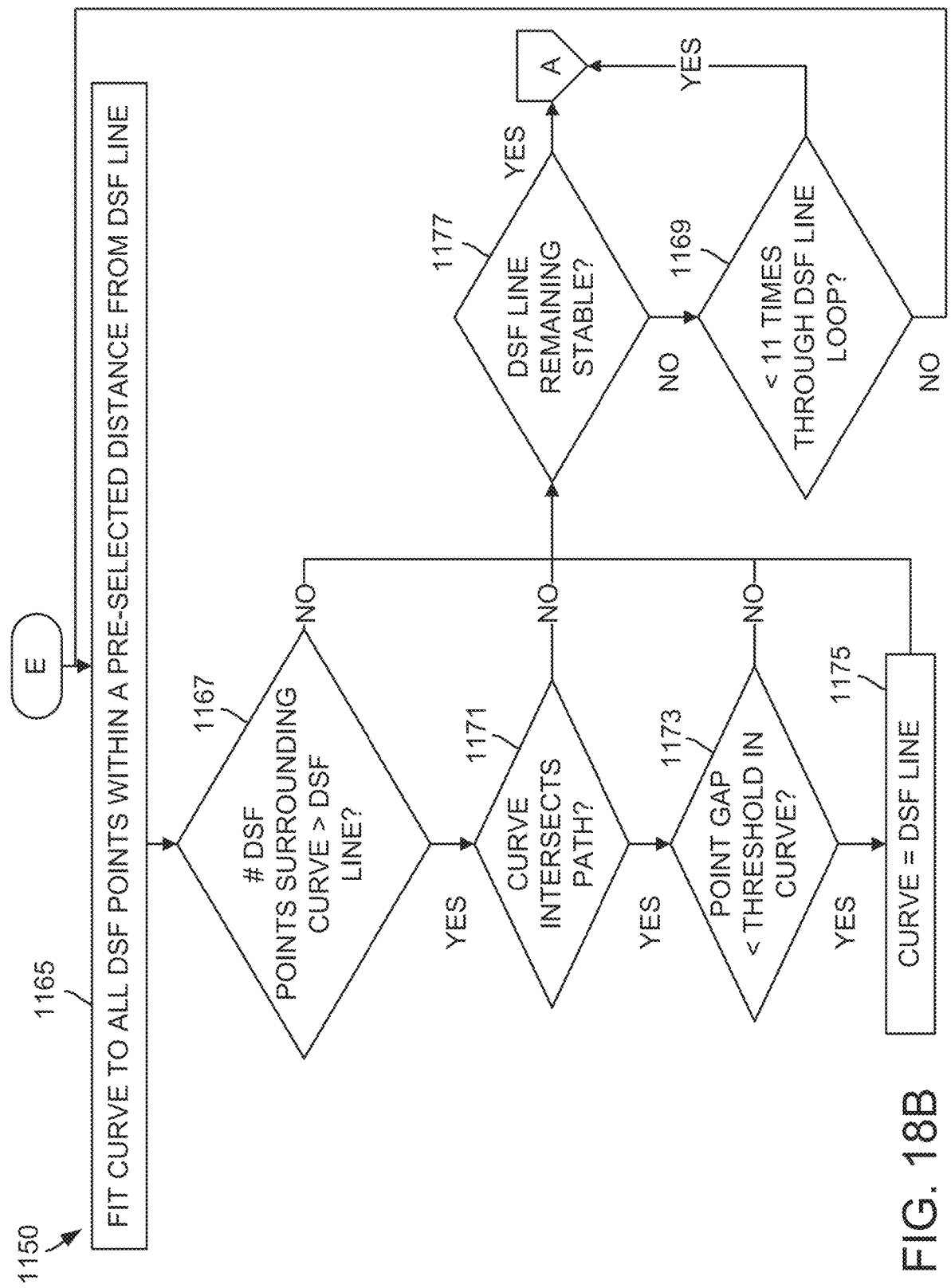

Referring now primarily to FIG. 18B, if 1159 (FIG. 18A) there are the first pre-selected number of points or more, method 1150 can include fitting 1165 a curve to the points that fall within the first pre-selected distance of the SDSF line. If 1167 the number of points that are within the first pre-selected distance of the curve exceeds the number of points within the first pre-selected distance of the SDSF line, and if 1171 the curve intersects the path line, and if 1173 there are no gaps between the points on the curve that exceed a second pre-selected distance, then method 1150 can include identifying 1175 the curve as the SDSF line. If 1167 the number of points that are within the first pre-selected distance of the curve does not exceed the number of points within the first pre-selected distance of the SDSF line, or if 1171 the curve does not intersect the path line, or if 1173 there are gaps between the points on the curve that exceed the second pre-selected distance, and if 1177 the SDSF line is not remaining stable, and if 1169 the curve fit has not been attempted more than the second pre-selected number of attempts, method 1150 can include returning to step 1165. A stable SDSF line is the result of subsequent iterations yielding the same or fewer points.

Figure 18C:
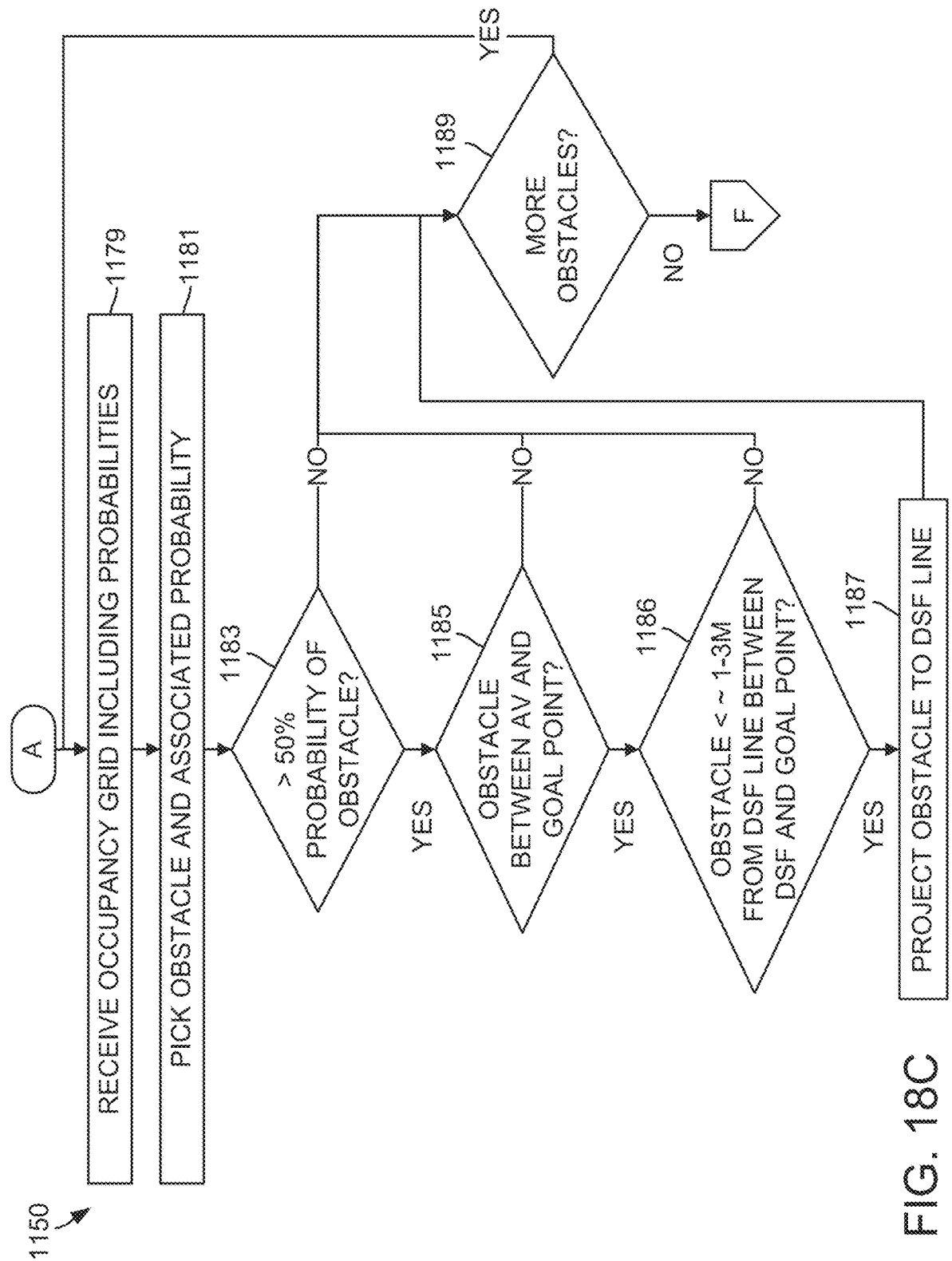

Referring now primarily to FIG. 18C, if 1169 (FIG. 18B) the curve fit has been attempted the second pre-selected number of attempts, or if 1177 (FIG. 18B) the SDSF line remains stable or degrades, method 1150 can include receiving 1179 occupancy grid information. The occupancy grid can provide the probability that obstacles exist at certain points. The occupancy grid information can augment the SDSF and path information that are found in the polygon that surrounds the TD path and the SDSF(s) when the occupancy grid includes data captured and/or computed over the common geographic area with the polygon. Method 1150 can include selecting 1181 a point from the common geographic area and its associated probability. If 1183 the probability that an obstacle exists at the selected point is higher than a pre-selected percent, and if 1185 the obstacle lies between the TD and the goal point, and if 1186 the obstacle is less than a third pre-selected distance from the SDSF line between SDSF line and the goal point, method 1150 can include projecting 1187 the obstacle to the SDSF line. If 1183 there is less than or equal to the pre-selected percent probability that the location includes an obstacle, or if 1185 the obstacle does not lie between the TD and the goal point, or if 1186 the obstacle lies at a distance equal to or greater than the third pre-selected distance from the SDSF line between the SDSF and the goal point, and if 1189 there are more obstacles to process, method 1150 can include resuming processing at step 1179.

Figure 18D:
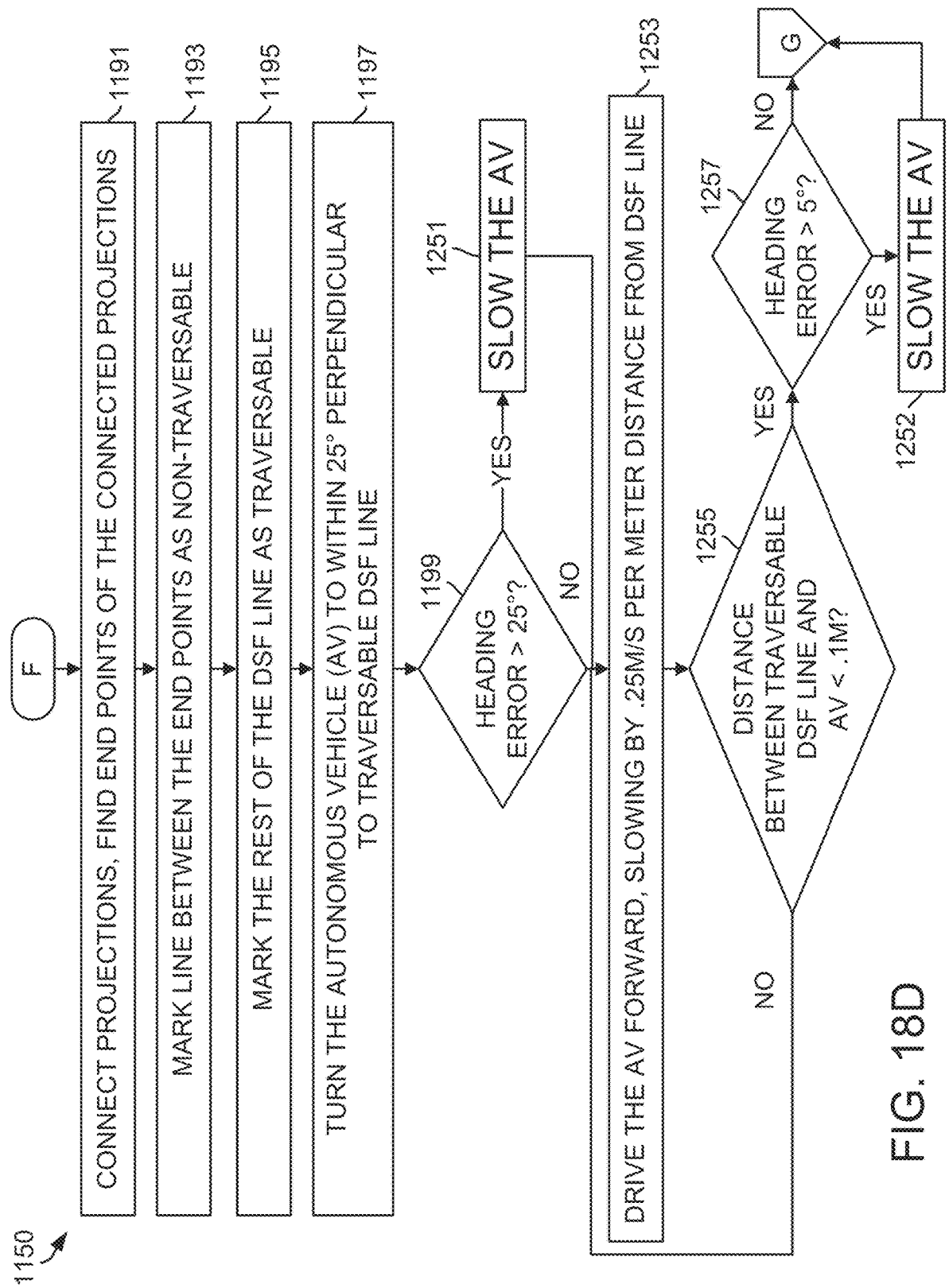

Referring now primarily to FIG. 18D, if 1189 (FIG. 18C) there are no more obstacles to process, method 1150 can include connecting 1191 the projections and finding the end points of the connected projections along the SDSF line. Method 1150 can include marking 1193 the part of the SDSF line between the projection end points as non-traversable. Method 1150 can include marking 1195 the part of the SDSF line that is outside of the non-traversable section as traversable. Method 1150 can include turning 1197 the TD to within a fifth pre-selected amount perpendicular to the traversable section of the SDSF line. If 1199 the heading error with respect to a line perpendicular to the traversable section of the SDSF line is greater than the first pre-selected amount, method 1150 can include slowing 1251 the TD by a ninth pre-selected amount. Method 1150 can include driving 1253 the TD forward towards the SDSF line, slowing by a second pre-selected amount per meter distance between the TD and the traversable SDSF line. If 1255 the distance of the TD from the traversable SDSF line is less than a fourth pre-selected distance, and if 1257 the heading error is greater than or equal to a third pre-selected amount with respect to a line perpendicular to the SDSF line, method 1150 can include slowing 1252 the TD by the ninth pre-selected amount.

Referring now primarily to FIG. 18E, if 1257 (FIG. 18D) the heading error is less than the third pre-selected amount with respect to a line perpendicular to the SDSF line, method 1150 can include ignoring 1260 updated SDSF information and driving the TD at a pre-selected speed. If 1259 the elevation of a front part of the TD relative to a rear part of the TD is between a sixth pre-selected amount and the fifth pre-selected amount, method 1150 can include driving 1261 the TD forward and increasing the speed of the TD to an eighth pre-selected amount per degree of elevation. If 1263 the front to rear elevation of the TD is less than the sixth pre-selected amount, method 1150 can include driving 1265 the TD forward at a seventh pre-selected speed. If 1267 the rear of the TD is more than a fifth pre-selected distance from the SDSF line, method 1150 can include noting 1269 that the TD has completed traversing the SDSF. If 1267, the rear of the TD is less than or equal to the fifth pre-selected distance from the SDSF line, method 1150 can include returning to step 1260.

Figure 19:
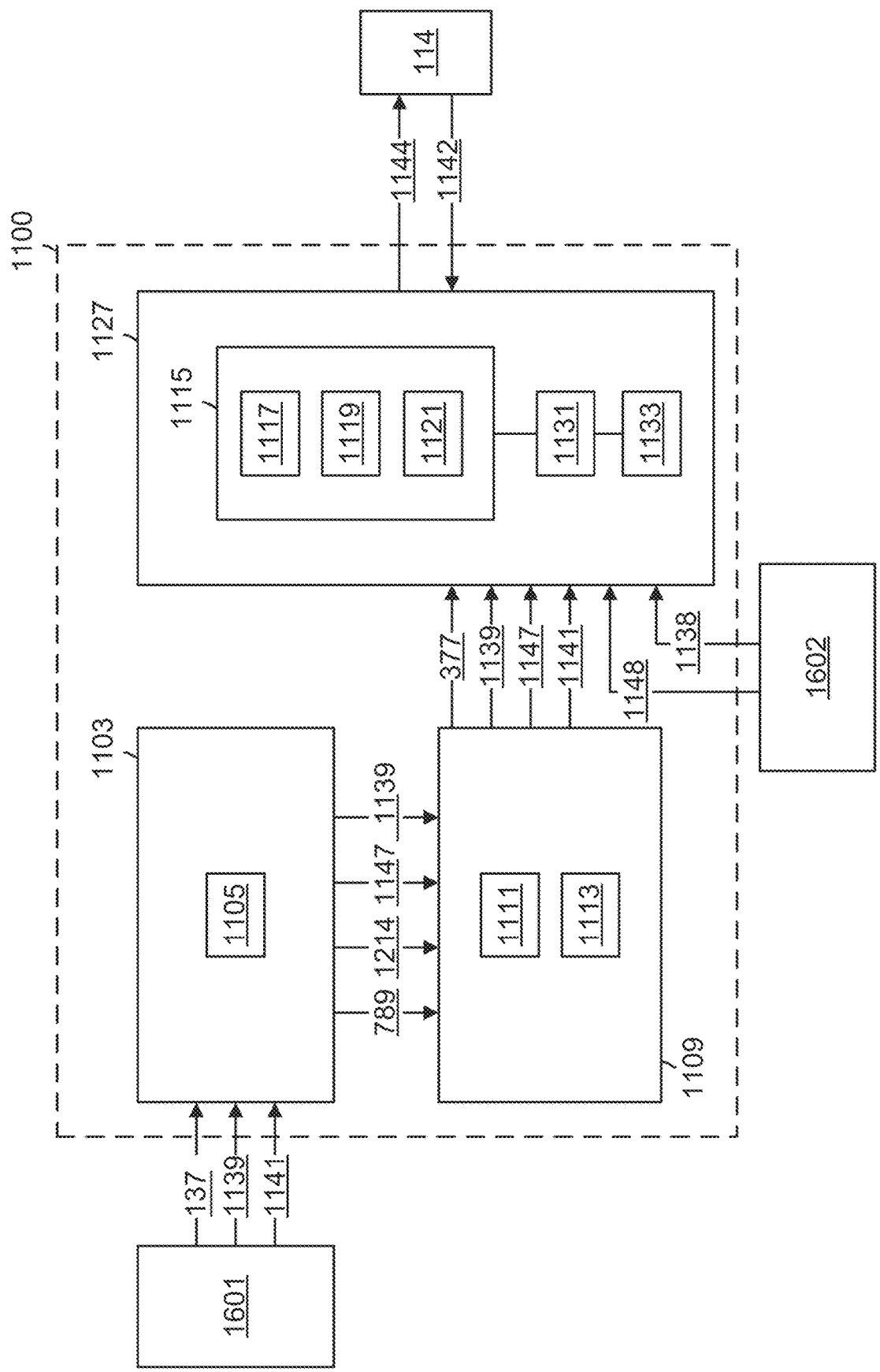
FIG. 19 is schematic block diagram of the system of the present teachings for traversing SDSFs.
Figure 20A:
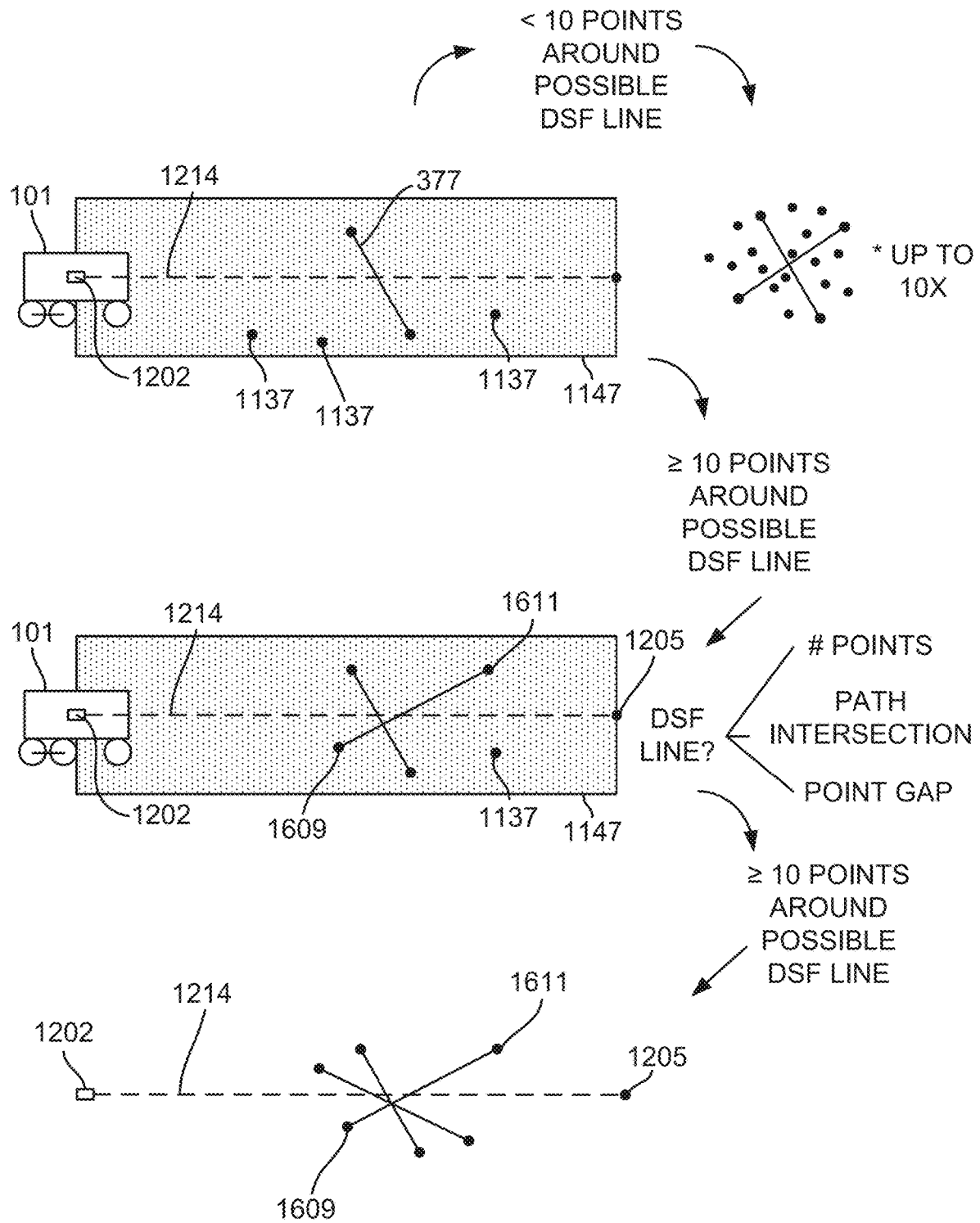
FIGS. 20A-20C are pictorial representations of the method of FIGS. 18A-18C.
Figure 20B:
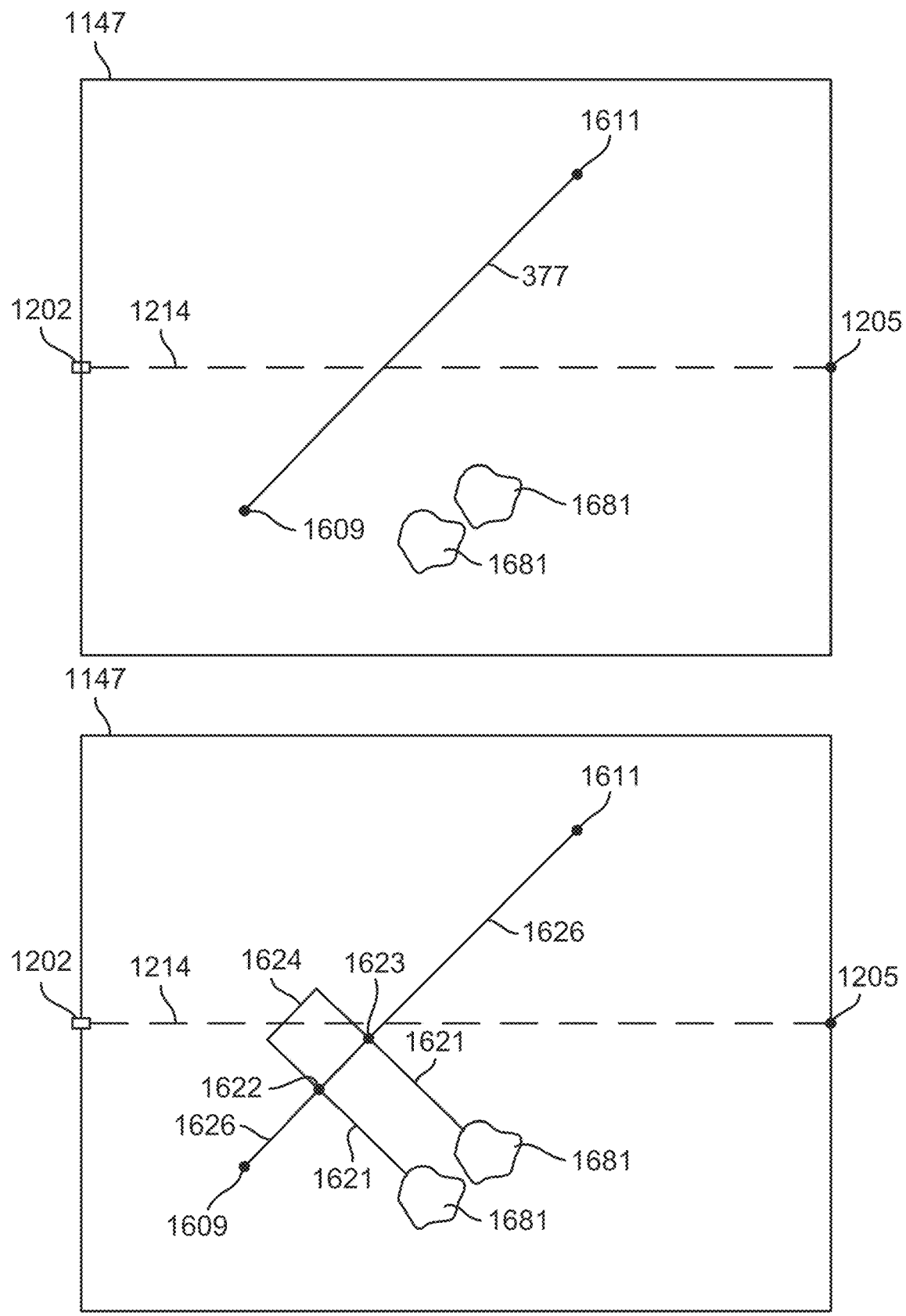

Referring now to FIG. 19, system 1100 for navigating a TD towards a goal point across at least one SDSF can include, but is not limited to including, path line processor 1103, SDSF detector 1109, and SDSF controller 1127. System 1100 can be operably coupled with surface processor 1601 that can process sensor information that can include, for example, but not limited to, images of the surroundings of TD 101 (FIG. 20A). Surface processor 1601 can provide real-time surface feature updates, including indications of SDSFs. In some configurations, cameras can provide RGB-D data whose points can be classified according to surface type. In some configurations, system 1100 can process the points that have been classified as SDSFs and their associated probabilities. System 1100 can be operably coupled with system controller 1602, which can manage aspects of the operation of TD 101 (FIG. 20A). System controller 1602 can maintain occupancy grid 1138 which can include information from available sources concerning navigable areas near TD 101 (FIG. 20A). Occupancy grid 1138 can include probabilities that obstacles exist. This information can be used, in conjunction with SDSF information, to determine if SDSF 377 (FIG. 20C) can be traversed by TD 101 (FIG. 20A), without encountering obstacle 1681 (FIG. 20B). System controller 1602 can determine, based on environmental and other information, speed limit 1148 that TD 101 (FIG. 20C) should not exceed. Speed limit 1148 can be used as a guide, or can override, speeds set by system 1100. System 1100 can be operably coupled with base controller 114 which can send drive commands 1144 generated by SDSF controller 1127 to the drive components of the TD 101 (FIG. 20A). Base controller 114 can provide information to SDSF controller 1127 about the orientation of TD 101 (FIG. 20A) during SDSF traverse.

Continuing to refer to FIG. 19, path line processor 1103 can continuously receive in real time surface classification points 789 that can include, but are not limited to including, points classified as SDSFs. Path line processor 1103 can receive the location of goal point 1139, and TD location 1141 as indicated by, for example, but not limited to, center 1202 (FIG. 20A) of TD 101 (FIG. 20A). System 1100 can include polygon processor 1105 drawing polygon 1147 encompassing TD location 1141, the location of goal point 1139, and path 1214 between goal point 1139 and TD location 1141. Polygon 1147 can include the pre-selected width. In some configurations, the pre-selected width can include approximately the width of TD 101 (FIG. 20A). SDSF points 789 that fall within polygon 1147 can be identified.

Continuing to refer to FIG. 19, SDSF detector 1109 can receive surface classification points 789, path 1214, polygon 1147, and goal point 1139, and can determine the most suitable SDSF line 377, according to criteria set out herein, available within the incoming data. SDSF detector 1109 can include, but is not limited to including, point processor 1111 and SDSF line processor 1113. Point processor 1111 can include selecting two of SDSF points 789 located within polygon 1147, and drawing SDSF 377 line between the two points. If there are fewer than the first pre-selected number of points within the first pre-selected distance of SDSF line 377, and if there have been less than the second pre-selected number of attempts at choosing SDSF points 789, drawing a line between the two points, and having fewer than the first pre-selected number of points around the SDSF line, point processor 1111 can include again looping through the selecting-drawing-testing loop as stated herein. If there have been the second pre-selected number of attempts at choosing SDSF points, drawing a line between them, and having fewer than the first pre-selected number of points around the SDSF line, point processor 1111 can include noting that no SDSF line was detected.

Continuing to refer to FIG. 19, SDSF line processor 1113 can include, if there are the first pre-selected number or more of points 789, fitting curve 1609-1611 (FIG. 20A) to points 789 that fall within the first pre-selected distance of SDSF line 377. If the number of points 789 that are within the first pre-selected distance of curve 1609-1611 (FIG. 20A) exceeds the number of points 789 within the first pre-selected distance of SDSF line 377, and if curve 1609-1611 (FIG. 20A) intersects path line 1214, and if there are no gaps between the points 789 on curve 1609-1611 (FIG. 20A) that exceed the second pre-selected distance, SDSF line processor 1113 can include identifying curve 1609-1611 (FIG. 20A) (for example) as SDSF line 377. If the number of points 789 that are within the pre-selected distance of curve 1609-1611 (FIG. 20A) does not exceed the number of points 789 within the first pre-selected distance of SDSF line 377, or if curve 1609-1611 (FIG. 20A) does not intersect path line 1214, or if there are gaps between points 789 on curve 1609-1611 (FIG. 20A) that exceed the second pre-selected distance, and if SDSF line 377 is not remaining stable, and if the curve fit has not been attempted more than the second pre-selected number of attempts, SDSF line processor 1113 can execute the curve fit loop again.

Figure 20C:
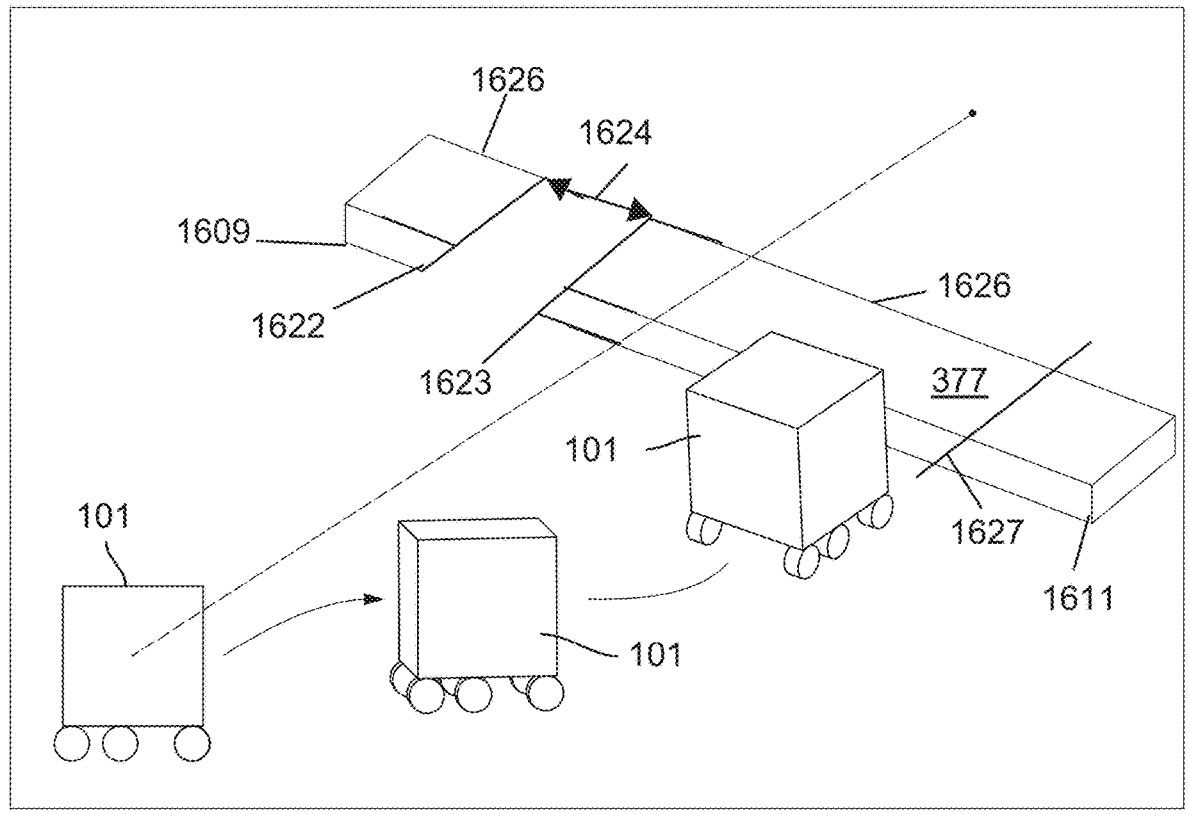
Figure 20C:
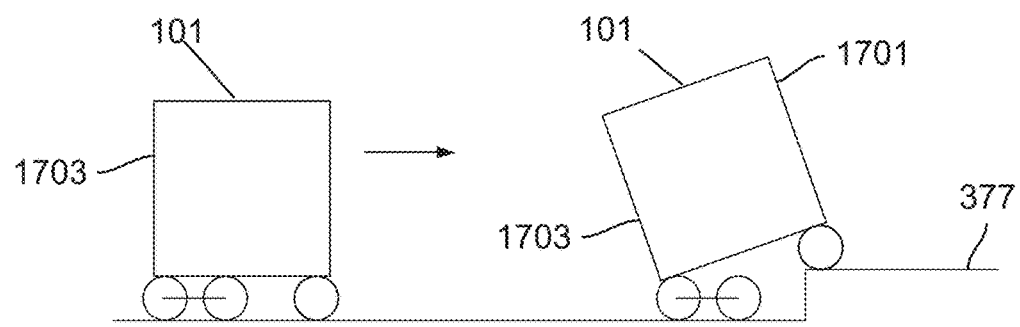

Continuing to refer to FIG. 19, SDSF controller 1127 can receive SDSF line 377, occupancy grid 1138, TD orientation changes 1142, and speed limit 1148, and can generate SDSF commands 1144 to drive TD 101 (FIG. 20A) to correctly traverse SDSF 377 (FIG. 20C). SDSF controller 1127 can include, but is not limited to including, obstacle processor 1115, SDSF approach 1131, and SDSF traverse 1133. Obstacle processor 1115 can receive SDSF line 377, goal point 1139, and occupancy grid 1138, and can determine if, among the obstacles identified in occupancy grid 1138, any of them could impede TD 101 (FIG. 20C) as it traverses SDSF 377 (FIG. 20C). Obstacle processor 1115 can include, but is not limited to including, obstacle selector 1117, obstacle tester 1119, and traverse locator 1121. Obstacle selector 1117 can include, but is not limited to including, receiving occupancy grid 1138 as described herein. Obstacle selector 1117 can include selecting occupancy grid point 1608 (FIG. 20B) and its associated probability from the geographic area that is common to both occupancy grid 1138 and polygon 1147. Obstacle tester 1119 can include, if the probability that an obstacle exists at the selected grid point 1608 (FIG. 20B) is higher than the pre-selected percent, and if the obstacle lies between TD 101 (FIG. 20A) and goal point 1139, and if the obstacle is less than the third pre-selected distance from SDSF line 377 between SDSF line 377 and goal point 1139, obstacle tester 1119 can include projecting the obstacle to SDSF line 377, forming projections 1621 that intersect SDSF line 377. If there is less than or equal to the pre-selected percent probability that the location includes an obstacle, or if the obstacle does not lie between TD 101 (FIG. 20A) and goal point 1139, or if the obstacle lies at a distance equal to or greater than the third pre-selected distance from SDSF line 377 between SDSF line 377 and goal point 1139, obstacle tester 1119 can include, if there are more obstacles to process, resuming execution at receiving occupancy grid 1138.

Continuing to refer to FIG. 19, traverse locator 1121 can include connecting projection points and locating end points 1622/1623 (FIG. 20B) of connected projections 1621 (FIG. 20B) along SDSF line 377. Traverse locater 1121 can include marking part 1624 (FIG. 20B) of SDSF line 377 between projection end points 1622/1623 (FIG. 20B) as non-traversable. Traverse locater 1121 can include marking parts 1626 (FIG. 20B) of SDSF line 377 that are outside of non-traversable part 1624 (FIG. 20B) as traversable.

Continuing to refer to FIG. 19, SDSF approach 1131 can include sending SDSF commands 1144 to turn TD 101 (FIG. 20C) to within the fifth pre-selected amount perpendicular to traversable part 1626 (FIG. 20C) of SDSF line 377. If the heading error with respect to perpendicular line 1627 (FIG. 20C), perpendicular to traversable section 1626 (FIG. 20C) of SDSF line 377, is greater than the first pre-selected amount, SDSF approach 1131 can include sending SDSF commands 1144 to slow TD 101 (FIG. 20C) by the ninth pre-selected amount. In some configurations, the ninth pre-selected amount can range from very slow to completely stopped. SDSF approach 1131 can include sending SDSF commands 1144 to drive TD 101 (FIG. 20C) forward towards SDSF line 377, sending SDSF commands 1144 to slow TD 101 (FIG. 20C) by the second pre-selected amount per meter traveled. If the distance between TD 101 (FIG. 20C) and traversable SDSF line 1626 (FIG. 20C) is less than the fourth pre-selected distance, and if the heading error is greater than or equal to the third pre-selected amount with respect to a line perpendicular to SDSF line 377, SDSF approach 1131 can include sending SDSF commands 1144 to slow TD 101 (FIG. 20C) by the ninth pre-selected amount.

Continuing to refer to FIG. 19, SDSF traverse 1133 can include, if the heading error is less than the third pre-selected amount with respect to a line perpendicular to SDSF line 377, SDSF traverse 1133 can include ignoring updated SDSF information and sending SDSF commands 1144 to drive TD 101 (FIG. 20C) at the pre-selected rate. If the TD orientation changes 1142 indicate that the elevation of leading edge 1701 (FIG. 20C) of TD 101 (FIG. 20C) relative to trailing edge 1703 (FIG. 20C) of TD 101 (FIG. 20C) is between the sixth pre-selected amount and the fifth pre-selected amount, SDSF traverse 1133 can include sending SDSF commands 1144 to drive TD 101 (FIG. 20C) forward, and sending SDSF commands 1144 to increase the speed of TD 101 (FIG. 20C) to the pre-selected rate per degree of elevation. If TD orientation changes 1142 indicate that leading edge 1701 (FIG. 20C) to trailing edge 1703 (FIG. 20C) elevation of TD 101 (FIG. 20C) is less than the sixth pre-selected amount, SDSF traverse 1133 can include sending SDSF commands 1144 to drive TD 101 (FIG. 20C) forward at the seventh pre-selected speed. If TD location 1141 indicates that trailing edge 1703 (FIG. 20C) is more than the fifth pre-selected distance from SDSF line 377, SDSF traverse 1133 can include noting that TD 101 (FIG. 20C) has completed traversing SDSF 377. If TD location 1141 indicates that trailing edge 1703 (FIG. 20C) is less than or equal to the fifth pre-selected distance from SDSF line 377, SDSF traverse 1133 can include executing again the loop beginning with ignoring the updated SDSF information.

Some exemplary ranges for pre-selected values described herein can include, but are not limited to including, those laid out in Table I.

TABLE I

| Variable | Range | Description |
| --- | --- | --- |
| $1^{st}$ pre-selected number | 7-50 | # of points surrounding a SDSF line |
| $2^{nd}$ pre-selected number | 8-20 | Attempts to determine a $1^{st}$ SDSF line |
| $1^{st}$ pre-selected distance | 0.03-0.08 m | Distance from the SDSF line |
| 2nd pre-selected distance | 1-7 m | Distance between SDSF points |
| 3rd pre-selected distance | 0.5-3 m | Distance of obstacle from SDSF line |
| 4th pre-selected distance | 0.05-0.5 m | Distance between TD and SDSF line |

TABLE I-continued

| Variable | Range | Description |
|---|---|---|
| 5th pre-selected distance | 0.3-0.7 m | Distance between rear of TD and SDSF line |
| $1^{st}$ pre-selected amount | 20°-30° | Heading error when TD is relatively far from SDSF line |
| $2^{nd}$ pre-selected amount | 0.2-0.3 m/s/meter | Amount of speed decrease when approaching SDSF line |
| 3rd pre-selected amount | 3°-8° | Heading error when td is relatively close to SDSF line |
| 5th pre-selected amount | 20°-30° | heading error with respect to perpendicular to SDSF line |
| 6th pre-selected amount | 5°-15° | Front to rear elevation of td |
| 7th pre-selected amount | 0.03-0.07 m/s | Constant speed of TD @ elevation < $6^{th}$ pre-selected amount |
| 8th pre-selected amount | 0.1-0.2 m/s/degree | Speed rate change when elevation between about 10°-25° |
| 9th pre-selected amount | 0-0.2 m/s | TD speed when heading error encountered |
| Pre-selected speed | 0.01-0.07 m/s | Driving rate near SDSF line |
| Pre-selected width | Width of TD-width of TD + 20 m | Width of polygon |
| Pre-selected % | 30-70% | Obstacle probability threshold |

Figure 21:
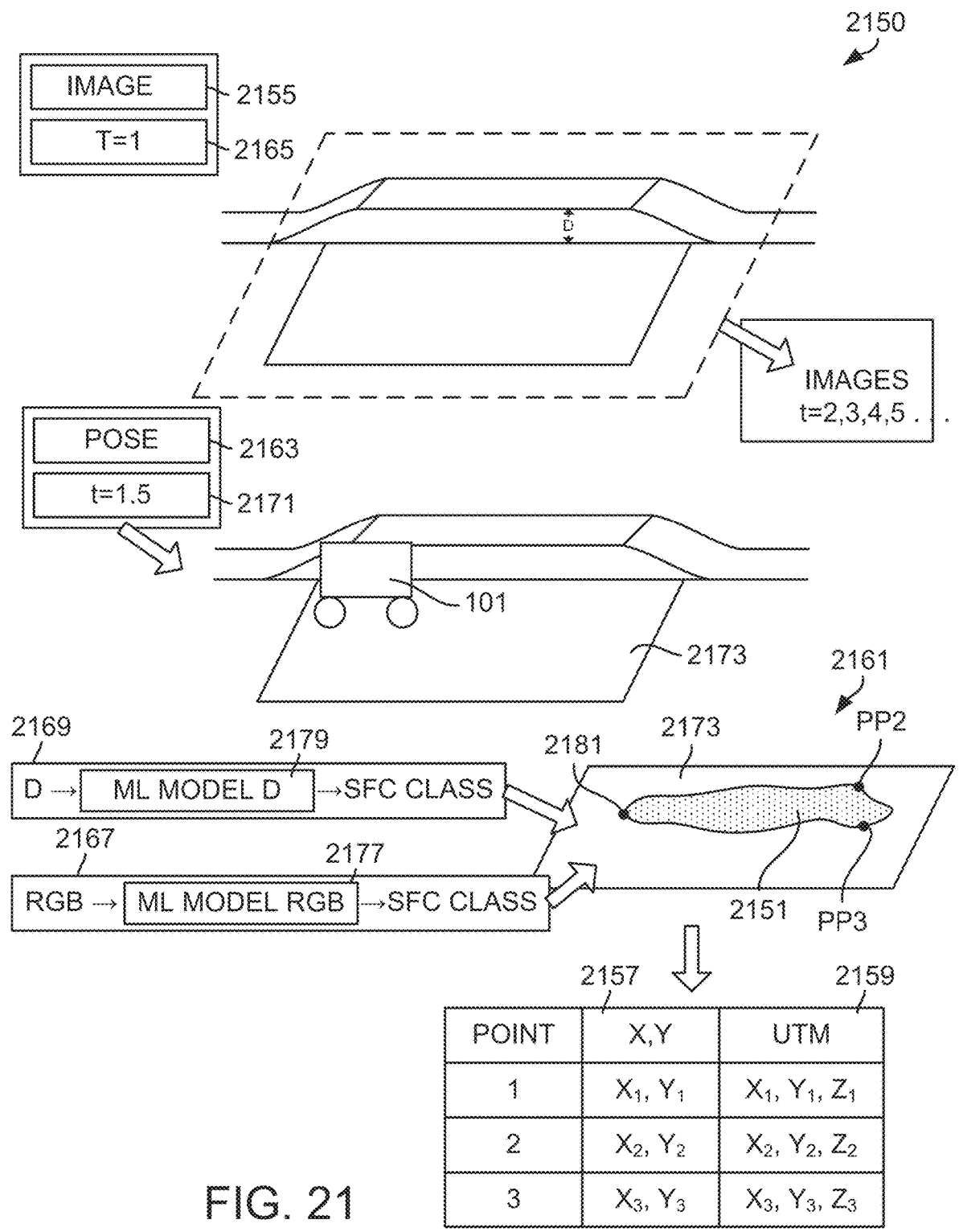
FIG. 21 is a pictorial representation of converting an image to a polygon.

Referring now to FIG. 21, to support real-time data gathering, in some configurations, the system of the present teachings can produce locations in three-dimensional space of various surface types upon receiving data such as, for example, but not limited to, RGD-D camera image data. The system can rotate images 2155 and translate them from camera coordinate system 2157 into UTM coordinate system 2159. The system can produce polygon files from the transformed images, and the polygon files can represent the three-dimensional locations that are associated with surface type 2161. Method 2150 for locating features 2151 from camera images 2155 received by TD 101, TD 101 having pose 2163, can include, but is not limited to including, receiving, by TD 101, camera images 2155. Each of camera images 2155 can include an image timestamp 2171, and each of images 2155 can include image color pixels 2167 and image depth pixels 2169. Method 2150 can include receiving pose 2163 of TD 101, pose 2163 having pose timestamp 2171, and determining selected image 2173 by identifying an image from camera images 2155 having a closest image timestamp 2165 to pose timestamp 2171. Method 2150 can include separating image color pixels 2167 from image depth pixels 2169 in selected image 2173, and determining image surface classifications 2161 for selected image 2173 by providing image color pixels 2167 to first machine learning model 2177 and image depth pixels 2169 to second machine learning model 2179. Method 2150 can include determining perimeter points 2181 of the features in camera image 2173, where the features can include feature pixels 2151 within the perimeter, each of feature pixels 2151 having the same surface classification 2161, each of perimeter points 2181 having set of coordinates 2157. Method 2150 can include converting each of sets of coordinates 2157 to UTM coordinates 2159.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software/firmware/hardware for accomplishing the methods discussed herein, and computer readable media storing software for accomplishing these methods. The various modules described herein can be accomplished on the same CPU, or can be accomplished on different CPUs. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

The invention claimed is:

1. A method for navigating at least one substantially discontinuous surface feature (SDSF) encountered by a transport device (TD), the TD traveling a path over a surface, the surface including the at least one SDSF, the path including a starting point and an ending point, the method comprising:
    accessing point cloud data representing the surface;
    forming the point cloud data into processable parts;
    merging the processable parts into at least one concave polygon;
    locating and labeling the at least one SDSF in the at least one concave polygon, the locating and labeling forming labeled point cloud data;

creating graphing polygons based at least on the at least one concave polygon comprising creating a convex polygon having exterior edges;
wherein one or more of the exterior edges has a weight based on: a directionality, a cost modifier, a drive mode, a current surface; an edge category, and combinations thereof; and
choosing the path from the starting point to the ending point based at least on the graphing polygons, the TD traversing the at least one SDSF along the path.

2. The method as in claim 1 further comprising filtering the point cloud data comprising:
conditionally removing points representing transient objects and points representing outliers from the point cloud data; and
replacing the removed points having a pre-selected height.

3. The method as in claim 1 wherein forming processable parts comprises:
segmenting the point cloud data into the processable parts; and
removing points of a pre-selected height from the processable parts.

4. The method as in claim 1 wherein the merging the processable parts comprises:
reducing a size of the processable parts by analyzing outliers, voxels, and normals;
growing regions from the reduced-size processable parts;
determining initial drivable surfaces from the grown regions;
segmenting and meshing the initial drivable surfaces;
locating polygons within the segmented and meshed initial drivable surfaces; and
setting at least one drivable surface based at least on the polygons.

5. The method as in claim 4 wherein the locating and labeling the at least one SDSF comprises:
sorting the point cloud data of the drivable surfaces according to a SDSF filter, the SDSF filter including at least three categories of points; and
locating at least one SDSF point based at least on whether the at least three categories of points, in combination, meet at least one first pre-selected criterion.

6. The method as in claim 5 further comprising:
creating at least one SDSF trajectory based at least on whether a plurality of the at least one SDSF points, in combination, meet at least one second pre-selected criterion.

7. The method as in claim 6 wherein said creating graphing polygons further comprises:
smoothing the exterior edges;
forming a driving margin based on the smoothed exterior edges;
adding the at least one SDSF trajectory to the at least one drivable surface; and
removing interior edges from the at least one drivable surface according to at least one third pre-selected criterion.

8. The method as in claim 7 wherein the smoothing of the exterior edges comprises:
trimming the exterior edges outward forming outward edges.

9. The method as in claim 7 wherein forming the driving margin of the smoothed exterior edges comprises:
trimming the outward edges inward.

10. A system for navigating at least one substantially discontinuous surface feature (SDSF) encountered by a TD, the TD traveling a path over a surface, the surface including the at least one SDSF, the path including a starting point and an ending point, the system comprising:
sensors;
a map processor;
a power base;
a device controller, the device controller including:
a first processor configured for accessing point cloud data representing the surface;
a second processor configured for forming processable parts from the point cloud data;
a third processor configured for merging the processable parts into at least one concave polygon;
a fourth processor configured for locating and labeling the at least one SDSF in the at least one concave polygon, the locating and labeling forming labeled point cloud data;
a fifth processor configured for creating graphing polygons comprising creating a convex polygon having exterior edges; and
wherein one or more of the exterior edges has a weight based on: a directionality, a cost modifier, a drive mode, a current surface; an edge category, and combinations thereof;
a sixth processor configured for choosing the path from the starting point to the ending point based at least on the graphing polygons, the TD traversing the at least one SDSF along the path.

11. The system as in claim 10 further comprising a filter that comprises:
a seventh processor configured for executing code including:
conditionally removing points representing transient objects and points representing outliers from the point cloud data; and
replacing the removed points having a pre-selected height.

12. The system as in claim 10 wherein the second processor includes executable code configured for:
segmenting the point cloud data into the processable parts; and
removing points of a pre-selected height from the processable parts.

13. The system as in claim 10 wherein the third processor includes executable code configured for:
reducing a size of the processable parts by analyzing outliers, voxels, and normals;
growing regions from the reduced-size processable parts;
determining initial drivable surfaces from the grown regions;
segmenting and meshing the initial drivable surfaces;
locating polygons within the segmented and meshed initial drivable surfaces; and
setting at least one drivable surface based at least on the polygons.

14. The system as in claim 13 wherein the fourth processor includes executable code configured for:
sorting the point cloud data of the drivable surfaces according to a SDSF filter, the SDSF filter including at least three categories of points; and
locating at least one SDSF point based at least on whether the at least three categories of points, in combination, meet at least one first pre-selected criterion.

15. The system as in claim 14 wherein the fourth processor includes executable code configured for creating at least one SDSF trajectory based at least on whether a plurality of the at least one SDSF points, in combination, meet at least one second pre-selected criterion.

16. The system as in claim 13 wherein creating graphing polygons includes an eighth processor including executable code comprising:
smoothing the exterior edges;
forming a driving margin based on the smoothed exterior edges;
adding the at least one SDSF trajectory to the at least one drivable surface; and
removing interior edges from the at least one drivable surface according to at least one third pre-selected criterion.

17. The system as in claim 16 wherein the smoothing the exterior edges includes a ninth processor including executable code configured for trimming the exterior edges outward forming outward edges.

18. The system as in claim 17 wherein forming the driving margin of the smoothed exterior edges includes a tenth processor including executable code configured for trimming the outward edges inward.

19. A method for navigating at least one substantially discontinuous surface feature (SDSF) encountered by a transport device (TD), the TD traveling a path over a surface, the surface including the at least one SDSF, the path including a starting point and an ending point, the method comprising:
accessing a route topology, the route topology including at least one graphing polygon comprising annotated point cloud data, the point cloud data including labeled features, the point cloud data including a drivable margin;
wherein:
the graphing polygon comprises a convex polygon, having exterior edges, based on a concave polygon based on merging processable parts from point cloud data; and
one or more of the exterior edges has a weight based on: a directionality; a cost modifier; a drive mode; a current surface; an edge category; and combinations thereof;
transforming the point cloud data into a global coordinate system;
determining boundaries of the at least one substantially discontinuous surface feature (SDSF);
creating SDSF buffers of a pre-selected size around the boundaries;
determining which of the at least one SDSFs can be traversed based at least on at least one SDSF traversal criterion;
creating an edge/weight graph based at least on the at least one SDSF traversal criterion, the transformed point cloud data, and the route topology; and
choosing the path from the starting point to the ending point based at least on the edge/weight graph.

20. The method as in claim 19 wherein the at least one SDSF traversal criterion comprises:
a pre-selected width of the at least one SDSF and a pre-selected smoothness of the at least one SDSF; and
a minimum ingress distance and a minimum egress distance between the at least one SDSF and the TD including a drivable surface,
wherein the minimum ingress distance between the at least one SDSF and the TD accommodating approximately a 90° approach by the TD to the at least one SDSF.

* * * * *